United States Patent
Arai

(10) Patent No.: US 10,033,726 B2
(45) Date of Patent: Jul. 24, 2018

(54) STORAGE MEDIUM STORING CONFERENCE SETTING PROGRAM AND CONFERENCE SETTING METHOD

(71) Applicant: Brother Kogyo Kabushiki Kaisha, Nagoya-shi, Aichi-ken (JP)

(72) Inventor: Kentaro Arai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 335 days.

(21) Appl. No.: 14/955,088

(22) Filed: Dec. 1, 2015

(65) Prior Publication Data
US 2016/0156615 A1    Jun. 2, 2016

(30) Foreign Application Priority Data
Dec. 1, 2014 (JP) ................................. 2014-243046

(51) Int. Cl.
G06F 17/30 (2006.01)
H04L 29/06 (2006.01)
H04L 12/18 (2006.01)

(52) U.S. Cl.
CPC ............ *H04L 63/083* (2013.01); *H04L 12/18* (2013.01); *H04L 12/1818* (2013.01); *H04L 63/102* (2013.01); *H04L 63/104* (2013.01); *H04L 65/403* (2013.01)

(58) Field of Classification Search
CPC ... H04L 12/18; H04L 12/1818; H04L 63/083; H04L 63/102; H04L 63/104; H04L 65/403; H04L 12/1822; H04L 41/5054; H04L 41/5061; H04L 63/0428; H04L 63/065; H04L 9/0836; H04L 9/321; G06F 21/31; G06F 21/6245; G06F 2221/2147
See application file for complete search history.

(56) References Cited

U.S. PATENT DOCUMENTS

| 2005/0044384 | A1* | 2/2005 | Kimura | .................. G06F 21/31 713/183 |
|---|---|---|---|---|
| 2013/0051543 | A1* | 2/2013 | McDysan | ........... H04M 3/4286 379/202.01 |

FOREIGN PATENT DOCUMENTS

JP    2011-054039 A    3/2011

* cited by examiner

*Primary Examiner* — Abiy Getachew
(74) *Attorney, Agent, or Firm* — Banner & Witcoff, Ltd.

(57) ABSTRACT

A conference setting method includes: displaying a first setting screen on a particular terminal configured to perform a setting operation of a teleconference, the first setting screen being switchable between: a first setting method having a plurality of password setting fields in which a password is set to each of at least three authorities having different numbers of executable functions; and a second setting method having a common authority setting field in which one of the at least three authorities is set as a common authority and having a common authority password setting field in which a password is set to the common authority; and storing, in a storage, passwords set in the password setting fields in association with respective ones of the at least three authorities; and storing, in the storage, a common authority password set in the common authority password setting field in association with the common authority.

11 Claims, 18 Drawing Sheets

FIG. 2

| | 30A | 30B | 30C | 30D | 30E | 30F | 30G | 30H |
|---|---|---|---|---|---|---|---|---|
| 30 | CONFERENCE ID | SETTER ID | AUTHENTICATION METHOD | HOST PASSWORD | PRESENTER PASSWORD | PARTICIPANT PASSWORD | GUEST PASSWORD | GUEST AUTHORITY |
| 31 | meeting1 | A001 | PASSWORD INPUT | host1 | presenter1 | participant1 | — | — |
| 32 | meeting2 | B002 | DEFAULT ROLE | — | — | — | guest1 | HOST |
| 33 | meeting3 | C003 | DEFAULT ROLE | host2 | presenter2 | — | guest2 | PARTICIPANT |
| | ... | ... | ... | ... | ... | ... | ... | ... |

STORAGE MEDIUM STORING CONFERENCE SETTING PROGRAM AND CONFERENCE SETTING METHOD

CROSS REFERENCE TO RELATED APPLICATIONS

This application claims priority from Japanese Patent Application No. 2014-243046 filed Dec. 1, 2014. The entire content of the priority application is incorporated herein by reference.

TECHNICAL FIELD

This disclosure relates to a storage medium storing a conference setting program, a conference setting apparatus, and a conference setting method for setting a teleconference conducted through a network.

BACKGROUND

A teleconference system is known in which a plurality of terminal apparatuses perform communication with one another through a conference server, thereby allowing a user who uses each terminal apparatus to conduct a teleconference through a network. For example, in a known communication conference system, when participating in a teleconference, a conference server receives a password inputted to a terminal apparatus by a user, and performs an authentication process based on the password stored in a hard disk. When authentication based on the password succeeds, the terminal apparatus of this user is allowed to participate in the teleconference. Further, in another teleconference system, by using a terminal apparatus, a conference creator who creates a teleconference sets a password for authorities (for example, a host, a presenter, a participant, and so on) in a conference. The set password is transmitted to guests. The terminal apparatuses of the guests can participate in the teleconference created by the conference creator, by using the received password.

SUMMARY

According to one aspect, this specification discloses a non-transitory computer-readable storage medium storing a conference setting program for setting a teleconference conducted among a plurality of terminal apparatuses through a network. The conference setting program is executable on a computer of a setting apparatus configured to receive a setting operation of the teleconference. The conference setting program causes, when executed, the setting apparatus to perform operations including: a display controlling operation of controlling displaying of an authentication method setting field configured to receive an operation to select either one of: displaying a setting screen of a first setting method having a plurality of password setting fields in which a password is set to each of at least three authorities having different numbers of executable functions in the teleconference; and displaying a setting screen of a second setting method having a common authority setting field in which one of the at least three authorities is set as a common authority and having a common authority password setting field in which a password is set to the common authority set in the common authority setting field; a determining operation of determining whether it is set that the setting screen of the first setting method is displayed in the authentication method setting field displayed by the display controlling operation; a first display controlling operation of displaying the setting screen of the first setting method, in response to determining by the determining operation that it is set that the setting screen of the first setting method is displayed; and a second display controlling operation of displaying the setting screen of the second setting method, in response to determining by the determining operation that it is not set that the setting screen of the first setting method is displayed.

According to another aspect, this specification also discloses a non-transitory computer-readable storage medium storing a conference setting program for setting a teleconference conducted among a plurality of terminal apparatuses through a network. The conference setting program is executable on a computer of a setting apparatus configured to receive a setting operation of the teleconference. The conference setting program causes, when executed, the setting apparatus to perform operations including: a display controlling operation of displaying one of a first setting screen and a second setting screen on a display of a particular terminal configured to perform a setting operation of the teleconference, the first setting screen being a setting screen that is switchable between: a first setting method having a plurality of password setting fields in which a password is set to each of at least three authorities having different numbers of executable functions in the teleconference; and a second setting method having a common authority setting field in which one of the at least three authorities is set as a common authority and having a common authority password setting field in which a password is set to the common authority set in the common authority setting field, the second setting screen being a setting screen for executing a third setting method having an authority setting field in which one of the at least three authorities is set, an additional password setting field in which a password is set to the authority set in the authority setting field, and an additional display button configured to receive an operation to additionally display the authority setting field and the additional password setting field; and a storage controlling operation of: storing, in a storage, passwords set in the plurality of password setting fields in the first setting screen of the first setting method, in association with respective ones of the at least three authorities, the passwords being in one-to-one correspondence with the respective ones of the at least three authorities; storing, in the storage, a common authority password set in the common authority password setting field in the first setting screen of the second setting method, in association with the common authority set in the common authority setting field; and storing, in the storage, the password set in the additional password setting field in the second setting screen, in association with the authority set in the authority setting field.

According to still another aspect, this specification also discloses a conference setting method of setting a teleconference conducted among a plurality of terminal apparatuses through a network. The method includes: a display controlling operation of displaying a first setting screen on a particular terminal configured to perform a setting operation of the teleconference, the first setting screen being a setting screen that is switchable between: a first setting method having a plurality of password setting fields in which a password is set to each of at least three authorities having different numbers of executable functions in the teleconference; and a second setting method having a common authority setting field in which one of the at least three authorities is set as a common authority and having a common authority password setting field in which a password is set to the common authority set in the common authority setting field;

and a storage controlling operation of: storing, in a storage, passwords set in the plurality of password setting fields in the first setting screen of the first setting method, in association with respective ones of the at least three authorities, the passwords being in one-to-one correspondence with the respective ones of the at least three authorities; and storing, in the storage, a common authority password set in the common authority password setting field in the first setting screen of the second setting method, in association with the common authority set in the common authority setting field.

BRIEF DESCRIPTION OF THE DRAWINGS

Embodiments in accordance with this disclosure will be described in detail with reference to the following figures wherein:

FIG. 2 shows a table of data configuration of a conference table 30;

DETAILED DESCRIPTION

Figure 1:
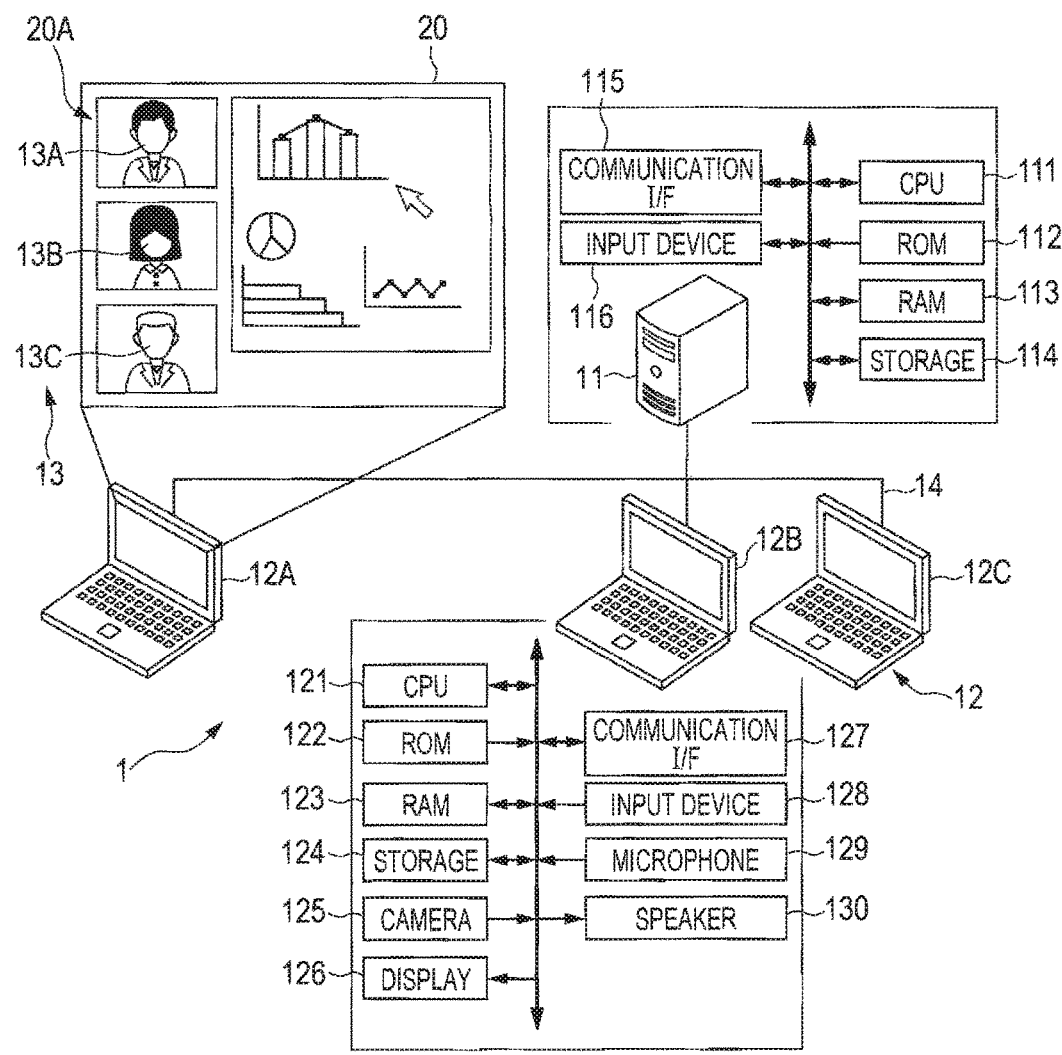
FIG. 1 shows the overall configuration of a teleconference system 1.

In the above-mentioned teleconference system, an input field for setting a password is displayed in a setting screen for scheduling a conference. For example, the setting screen includes three input fields for respective ones of a host, a presenter, and a participant which are authorities in a conference. In this case, even when only two of the authorities in the conference are used, a user needs to set a password to all of the three input fields to schedule a conference.

An example of the objective of an aspect of this disclosure is to provide a storage medium storing a conference setting program, a conference setting apparatus, and a conference setting method that allows a user to easily set a password depending on the authority in a conference.

<Overview of Teleconference System 1>

A teleconference system 1 will be described while referring to FIG. 1. The teleconference system 1 includes a conference server 11 and a plurality of communication terminals 12. The conference server 11 and the communication terminals 12 are connected with one another through a network 14. The teleconference system 1 is a system for realizing a teleconference among a plurality of users by providing a virtual conference room to users 13 of each communication terminal 12. The conference server 11 is a known MPU (Multi-point Control Unit). The conference server 11 may be a general-purpose server. The communication terminals 12 are known general-purpose PCs (Personal Computer) used by the users 13. In the present embodiment, three communication terminals 12A, 12B, and 12C are illustrated as the plurality of communication terminals 12. The users 13 of each communication terminal 12A, 12B, 12C is referred to as user 13A, 13B, 13C, respectively.

<Electrical Configuration>

The electrical configuration of the conference server 11 will be described. The conference server 11 includes a CPU 111 that manages controls of the conference server 11. The CPU 111 is electrically connected to a ROM 112, a RAM 113, a storage 114, a communication interface 115, and an input device 116. The ROM 112 stores a boot program, BIOS, and so on. The RAM 113 stores a timer, a counter, and transitory data. The storage 114 stores a conference program, an OS, a conference table 30 described later (see FIG. 2), and so on. The conference program is a program for allowing the CPU 111 to execute various processes relating to teleconference. The storage 114 is a computer-readable non-transitory storage medium that is, for example, a hard disk and so on. The non-transitory storage medium is a storage capable of holding information, unlike a transitory storage medium such as transmission signals. For example, the storage 114 may be any non-transitory storage medium such as a flash memory and a ROM. The communication interface 115 is an interface element (e.g., a LAN card) for the conference server 11 to connect to the network 14. The CPU 111 performs transmission and reception of data with another apparatus connected to the network 14, through the communication interface 115. For example, the input device 116 includes buttons, a keyboard, a mouse, and so on.

The conference server 11 includes a drive device (not shown). The drive device reads out information stored in a computer-readable storage medium such as a semiconductor memory. The CPU 111 reads out the conference program stored in the storage medium by the drive device, and stores the conference program in the storage 114. For example, the conference program may be downloaded from another server connected to the network 14 (that is, transmitted as transmission signals) and may be stored in the storage 114. In this case, the conference program may be stored in a non-transitory storage medium such as a HDD provided to the other server.

The electrical configuration of the communication terminal 12 will be described. The communication terminal 12 includes a CPU 121 that manages controls of the communication terminal 12. The CPU 121 is electrically connected to a ROM 122, a RAM 123, a storage 124, a camera 125, a display 126, a communication interface 127, an input device 128, a microphone 129, a speaker 130, and a drive device (not shown). The ROM 122 stores a boot program, BIOS, and so on. The RAM 123 stores a timer, a counter, flag information, temporary data, and so on. The storage 124 includes a non-transitory storage medium, similarly to the storage 114. The storage 124 stores an OS and a known Web browser.

The display 126 is a liquid crystal display, for example. The communication interface 127 is an interface element (e.g., a LAN card) for allowing the communication terminal 12 to perform hard-wired connection to the network 14, or an interface element for allowing the communication terminal 12 to connect to an access point (not shown) connected to the network 14 to perform wireless communication. The CPU 121 performs transmission and reception of data with another apparatus connected to the network 14, through the communication interface 127, in accordance with a particular communication protocol. For example, the input device 128 includes buttons, a keyboard, a mouse, a touch panel, and so on. The CPU 121 reads out programs such as a Web browser from a storage medium through the drive device (not shown) or downloads such programs from another server through the network 14, and stores the programs in the storage 124.

<Overview of Conference Room>

The procedure of a case where the user 13 of the communication terminal 12 uses a conference room provided by the conference server 11 will be described while referring to a specific example. For example, in order to set a conference room, the user 13A operates the communication terminal 12A to start up a Web browser, and accesses a particular URL (Uniform Resource Locator) and gives an instruction to set a conference room. In this case, the CPU 111 of the conference server 11 sets a conference room by a conference creating process (see FIG. 3) described later. That is, the conference server 11 is an example of a setting apparatus configured to receive a setting operation of a teleconference.

Next, in response to the operation of the user 13A, the communication terminal 12A transmits electronic mail for conference invitation to electronic mail addresses of the communication terminals 12B, 12C in order to invite the users 13B, 13C to the set conference room. This electronic mail includes a URL needed for the users 13B, 13C to access the conference room and an entrance password described later. This URL includes a conference ID for identifying the conference room.

Next, the user 13A performs an operation for entering the set conference room by using the Web browser started up in the communication terminal 12A. In this case, the CPU 121 of the communication terminal 12A transmits a conference ID of the conference room set by the user 13A to the conference server 11. The CPU 111 of the conference server 11 establishes a session of the conference room indicated by the received conference ID between the communication terminal 12A and the conference server 11, by a conference participating process described later (see FIG. 7). The CPU 111 of the conference server 11 stores, in the storage 114, identification information for identifying at least one of the communication terminal 12A and the user 13A, in association with the conference ID. That is, for example, the identification information may be an IP address, a mail address, or the like for identifying the communication terminal 12A, or may be a user ID or the like for identifying the user 13A.

The CPU 121 of the communication terminal 12B receives an electronic mail transmitted from the communication terminal 12A, and displays a URL and an entrance password on the display 126. In response to an operation of the user 13B who selects the URL, the CPU 121 of the communication terminal 12B transmits a conference ID included in the URL to the conference server 11. The CPU 111 of the conference server 11 stores, in the storage 114, identification information for identifying at least one of the communication terminal 12B and the user 13B, in association with the conference ID. The CPU 111 of the conference server 11 establishes a session of the conference room indicated by the received conference ID between the communication terminal 12B and the conference server 11, by the conference participating process described later (see FIG. 7). Similarly, the CPU 111 of the conference server 11 establishes a session of the conference room between the communication terminal 12C and the conference server 11.

With these processes, the users 13A to 13C have entered the conference room set by the user 13A. Note that, for example, the CPU 111 of the conference server 11 transmits an application for teleconference (hereinafter abbreviated as "conference application") to the communication terminals 12A to 12C. The conference application is stored in the storage 114 of the conference server 11. The CPU 111 of each communication terminal 12A to 12C executes the received conference application. With these processes, the communication terminals 12A to 12C use the conference application to conduct a teleconference in a conference room for which sessions are established, under controls by the CPU 111 of the conference server 11.

Specifically, a conference application window 20 shown in FIG. 1 is displayed on the display 126 of each communication terminal 12A to 12C. Each conference application window 20 includes a video window 20A that displays video shot by the camera 125 of each communication terminal 12A to 12C. For example, video images of at least other users 13B, 13C are outputted to the video window 20A of the communication terminal 12A. The CPU 121 of each communication terminal 12A to 12C executes the conference application, which causes audio (sound) collected by the microphone 129 of other communication terminals 12B, 12C to be outputted from the speaker 130 of the communication terminal 12A, for example. The user 13A can conduct a teleconference with other users 13B, 13C while checking video and audio of the other users 13B, 13C who are in the conference room.

Specifically, the CPU 121 of the communication terminal 12A encodes video data shot by the camera 125 in accordance with a particular standard such as H.264. The CPU 121 transmits the encoded video data to the conference server 11. The CPU 111 of the conference server 11 transfers video data received from the communication terminal 12A to other communication terminals associated with the conference ID of the conference in which the communication terminal 12A or the user 13A participates, that is, the communication terminals 12B and 12C. Similarly, the CPU 121 of the communication terminal 12A codes audio collected by the microphone 129 in accordance with a particular standard such as G.711 and G.722. The CPU 121 transmits the coded audio data to the conference server 11. The CPU 111 of the conference server 11 transfers audio data received from the communication terminal 12A to the other communication terminals associated with the conference ID of the conference in which the communication terminal 12A or the user 13A participates.

One of authorities (or may be referred as roles) "host", "presenter", and "participant" is given to the user 13 who has entered the conference room, that is, to the corresponding communication terminal 12. For example, depending on the authority, the number of functions executable in a teleconference by the communication terminals 12A to 12C is different. The "host" is the organizer of the conference room. The "presenter" makes presentation to other users 13 in the conference room by using document data and so on. The "participant" is other than "host" and "presenter" out of the users 13 in the conference room. The above-described conference application or the conference server 11 provides a plurality of functions in a conference room, depending on the authority. The number of functions usable by the users 13 in a conference room is the largest for "host", and becomes smaller in the sequence of "presenter" and "participant".

A specific example of functions usable in a conference room includes nine functions of "audio", "video", "document sharing", "chat", "file transfer", "recording", "desktop sharing", "document printing", and "whiteboard". The function of "audio" is for outputting the sound collected by the microphone 129 of other communication terminals 12 from the speaker 130. The function of "video" is for displaying the video shot by the camera 125 of the communication terminals 12. The function of "document sharing" is for displaying document data for sharing with other communication terminals 12. The function of "chat" is for chatting. The function of "file transfer" is for transferring a file to other communication terminals 12. The function of "recording" is for recording video, audio, and a shared document in the conference. The function of "desktop sharing" is for sharing a desktop with other communication terminals 12. The function of "document printing" is for printing a document shared by the function of "document sharing". The function of "whiteboard" is for sharing a virtual whiteboard with other communication terminals 12.

For example, the "host" can use all the above-described nine functions. The "presenter" can use seven functions excluding the functions "document printing" and "whiteboard" out of the above-described nine functions. The "participant" can use four functions excluding the functions "file transfer", "recording", "desktop sharing", "document printing", and "whiteboard" out of the above-described nine functions. Note that the functions provided by the conference application and the functions usable by each authority are not limited to the above-described example. Here, the "host" is a higher level authority than "presenter" and "participant". The "presenter" is a lower level authority than "host" and is a higher level authority than "participant". The "participant" is a lower level authority than "host" and "presenter". That is, it is set such that a higher level authority can use a larger number of functions in a conference room.

Figure 16:
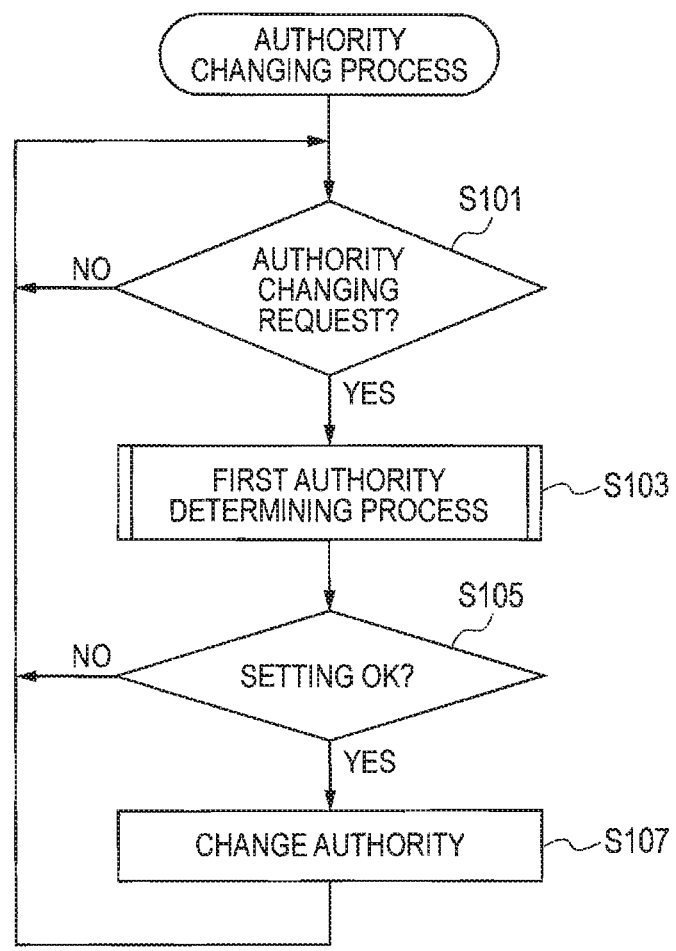
FIG. 16 shows a flowchart of an authority changing process.

The CPU 111 of the conference server 11 changes the authority of the user 13 in the conference room while a teleconference is being conducted, by executing an authority changing process described later (see FIG. 16). The CPU 111 of the conference server 11 changes the settings of an existing conference room, by executing a setting changing process described later (see FIG. 10).

<Conference Table 30>

The conference table 30 will be described while referring to FIG. 2. The conference table 30 stores conference information set for each conference room. The conference information includes information relating to each setting item of a conference ID 30A, a setter ID 30B, an authentication method 30C, a host password 30D, a presenter password 30E, a participant password 30F, a guest password 30G, and a guest authority 30H. The conference ID 30A is identification information for identifying a conference room. The setter ID 30B is identification information for identifying the user 13 who sets a conference room identified by the conference ID 30A. The authentication method 30C indicates whether a method for authenticating the user 13 who requests entry to the conference room identified by the conference ID 30A is "password input" or "default role" described later.

The host password 30D is a password for giving authority of "host" to the user 13 in the conference room identified by the conference ID 30A. The presenter password 30E is a password for giving authority of "presenter" to the user 13 in the conference room identified by the conference ID 30A. The participant password 30F is a password for giving authority of "participant" to the user 13 in the conference room identified by the conference ID 30A. That is, the passwords 30D, 30E, and 30F are in one-to-one correspondence with the respective ones of the three authorities "host", "presenter", and "participant". Each of the host password 30D, the presenter password 30E, and the participant password 30F functions as an entrance password and an authority changing password. The entrance password is a password for the user 13 to enter a conference room. The authority changing password is a password for changing the authority of the user 13 while a teleconference is being conducted.

The guest password 30G is a password for giving authority indicated by the guest authority 30H to the user 13, in the conference room identified by the conference ID 30A. The guest authority 30H indicates which one of "host", "presenter", or "participant" the guest authority is. The guest authority 30H is common authority that is authority given in common to the users 13 who enter the conference room identified by the conference ID 30A. The guest password 30G functions as an entrance password.

First Embodiment: Processes Executed by Teleconference System 1

Processes executed by the teleconference system 1 in the first embodiment will be described while referring to FIGS. 3 to 10. Based on the conference program stored in the ROM 112, the CPU 111 of the conference server 11 executes a process of controlling a known teleconference, a conference creating process (see FIG. 3), a conference participating process (see FIG. 7), a setting changing process (see FIG. 10), and so on.

The conference creating process will be described while referring to FIG. 3. First, the CPU 111 determines whether there is a conference creating request (S1). As described above, the CPU 121 of the communication terminal 12 in which a setting instruction of a conference room has been given transmits the conference creating request to the conference server 11. When the conference creating request is received by the conference server 11, the CPU 111 determines that there is a conference creating request (S1: YES) and executes a login process (S3). If there is no conference creating request (S1: NO), the CPU 111 returns the process to S1.

In the login process (S3), the CPU 111 creates a login screen (not shown) and transmits the login screen to the communication terminal 12. In the present embodiment, creating and transmitting a screen means, for example, creating a screen based on display data stored in the storage 114 and transmitting the created screen to the communication terminal 12, or transmitting, to the communication terminal 12, display data for the CPU 121 of the communication terminal 12 to create a screen by a browser stored in the storage 124. An example of the display data is source information including a markup language such as HTML and a script such as JAVA™. The CPU 121 of the communication terminal 12 creates a screen based on source information, by executing the source information by the browser stored in the storage 124.

The CPU 121 of the communication terminal 12 displays the received login screen on the display 126. The login screen includes input fields of a user ID and a password. The user 13 inputs the user ID and the password in the login screen. The CPU 121 transmits the inputted user ID and password to the conference server 11. The CPU 111 determines whether the received user ID and password are identical to the user ID and password of a valid user stored in the storage 114 and, when the user IDs and passwords are identical, determines that login is OK (S5: YES). In this case, the CPU 111 executes a conference setting process described later (S7). When login is not OK (S5: NO), the CPU 111 returns the process to S3.

Figure 4:
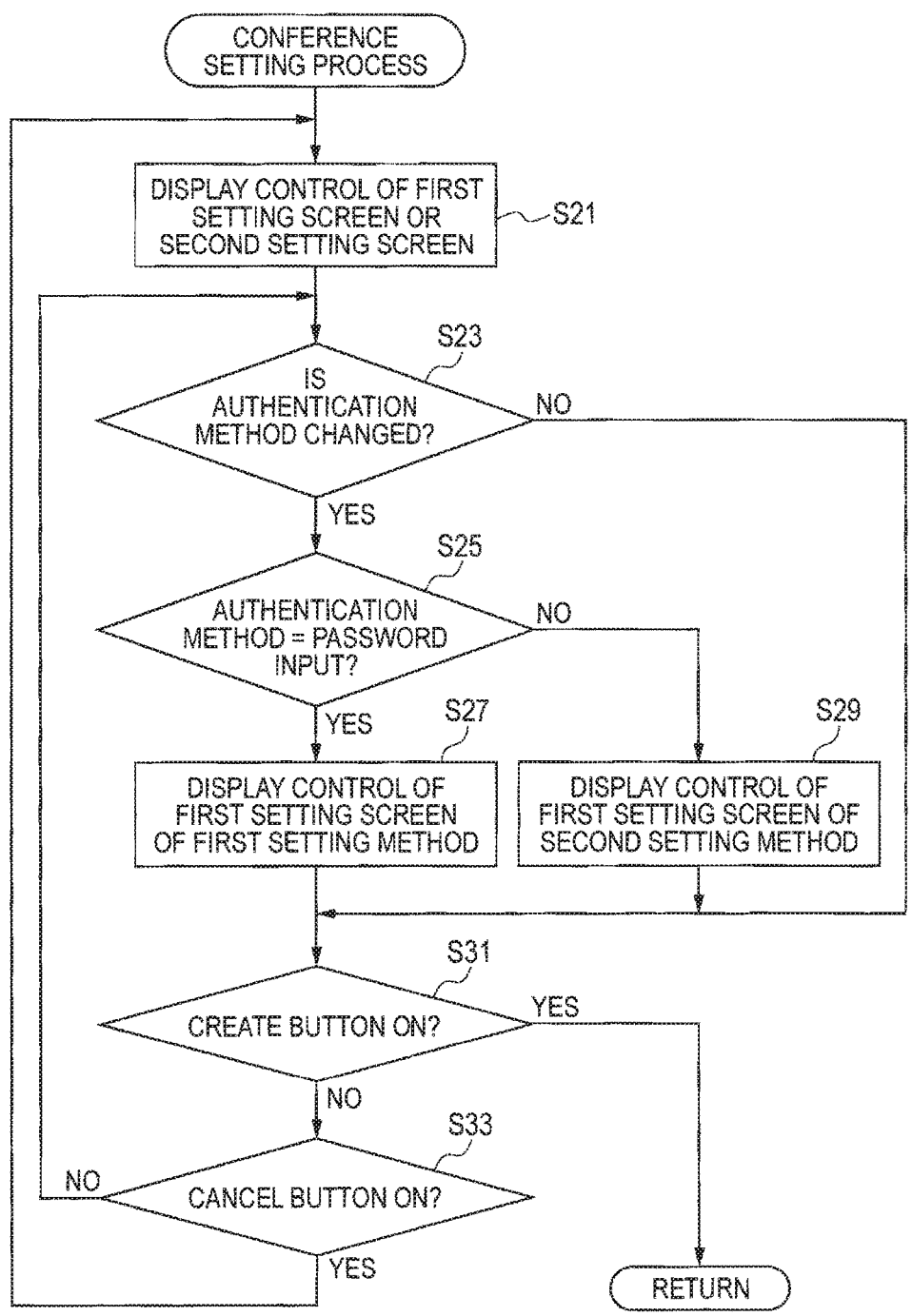
FIG. 4 shows a flowchart of a conference setting process.

As shown in FIG. 4, in the conference setting process, first, the CPU 111 executes display control of the first setting screen 40 (see FIG. 5) or the second setting screen 50 (see FIG. 6) (S21). Specifically, the CPU 111 creates the first setting screen 40 or the second setting screen 50, and transmits the screen to a conference creating terminal as a particular terminal. The conference creating terminal is the communication terminal 12 that is the transmission source of the conference creating request. That is, the conference creating terminal is the communication terminal 12 having transmitted the user ID and password of the valid user stored in the storage 114 to the conference server 11 in the login process of S3. The CPU 121 of the conference creating terminal controls the Web browser to display the received first setting screen 40 or second setting screen 50 on the display 126.

Note that which one of the first setting screen 40 and the second setting screen 50 the CPU 111 controls to display in S21 may be preliminarily set in the RAM 113. Information indicative of which one of the first setting screen 40 and the second setting screen 50 is to be displayed may be included in the conference creating request. The storage 114 may store a control program for displaying only one of the first setting screen 40 and the second setting screen 50 without storing the other one of the first setting screen 40 and the second setting screen 50. In this case, in accordance with the control program stored in the storage 114, only one of the first setting screen 40 and the second setting screen 50 is transmitted to the conference creating terminal. The first setting screen 40 has two methods of a first setting method and a second setting method described later. In the present embodiment, when the CPU 111 controls to display the first setting screen 40 in S21, the CPU 111 creates and transmits the first setting screen 40 of the first setting method (see the left side of FIG. 5).

Figure 5:
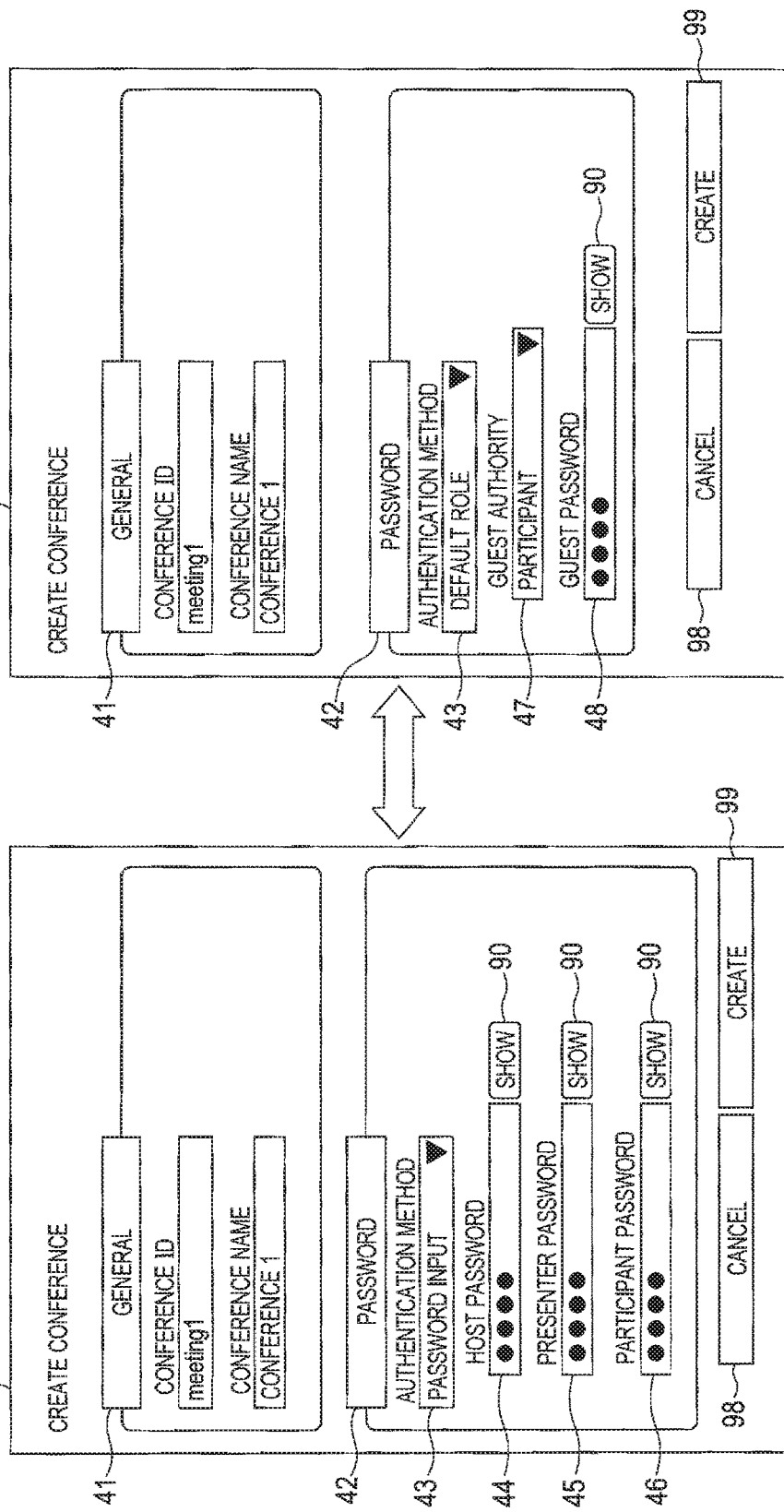
FIG. 5 is a diagram showing a specific example of a first setting screen 40 according to a first embodiment.

As shown in FIG. 5, the first setting screen 40 is a setting screen that is switchable between the first setting method and the second setting method. In each of the first setting method and the second setting method, the user 13 can set a password in different methods. The first setting screen 40 includes a general information setting section 41 for setting information relating to a conference room, a password information setting section 42 for setting information relating to a password, a cancel button 98 for cancelling inputted information, and a create button 99 for confirming inputted information. The general information setting section 41 includes input fields of a conference ID and a conference name. The password information setting section 42 includes an authentication method selection field 43. The authentication method selection field 43 is configured to receive an operation to select the authentication method. For example, the authentication method selection field 43 is a pull-down menu by which "password input" or "default role" is selected as the authentication method. Depending on the authentication method selected by the authentication method selection field 43, the display content of the password information setting section 42 is switched as described below.

As shown in the left side of FIG. 5, when "password input" is selected in the authentication method selection field 43, setting items based on the first setting method is displayed. Specifically, an input field 44 for inputting a host password, an input field 45 for inputting a presenter password, and an input field 46 for inputting a participant password are displayed in the password information setting section 42. The password inputted in each input field 44 to 46 is displayed by alternate symbols for confidentiality. A show button 90 is displayed at the right side of each input field 44 to 46. Each show button 90 is a button for switching a display mode of the input field located at the left side of each show button 90. Specifically, when the show button 90 is pressed, the alternate symbol shown in the corresponding input field is switched to the password that is actually inputted.

As shown in the right side of FIG. 5, when "default role" is selected in the authentication method selection field 43, setting items based on the second setting method are displayed. Specifically, a guest authority selection field 47 and a guest password input field 48 are displayed in the password information setting section 42. The guest authority selection field 47 is a pull-down menu by which one of "host", "presenter", and "participant" is selected as the guest authority. The guest password input field 48 is an input field for inputting a password corresponding to the guest authority set in the guest authority selection field 47. The show button 90 for switching the display mode of the guest password input field 48 is displayed at the right side of the guest password input field 48.

Figure 6:
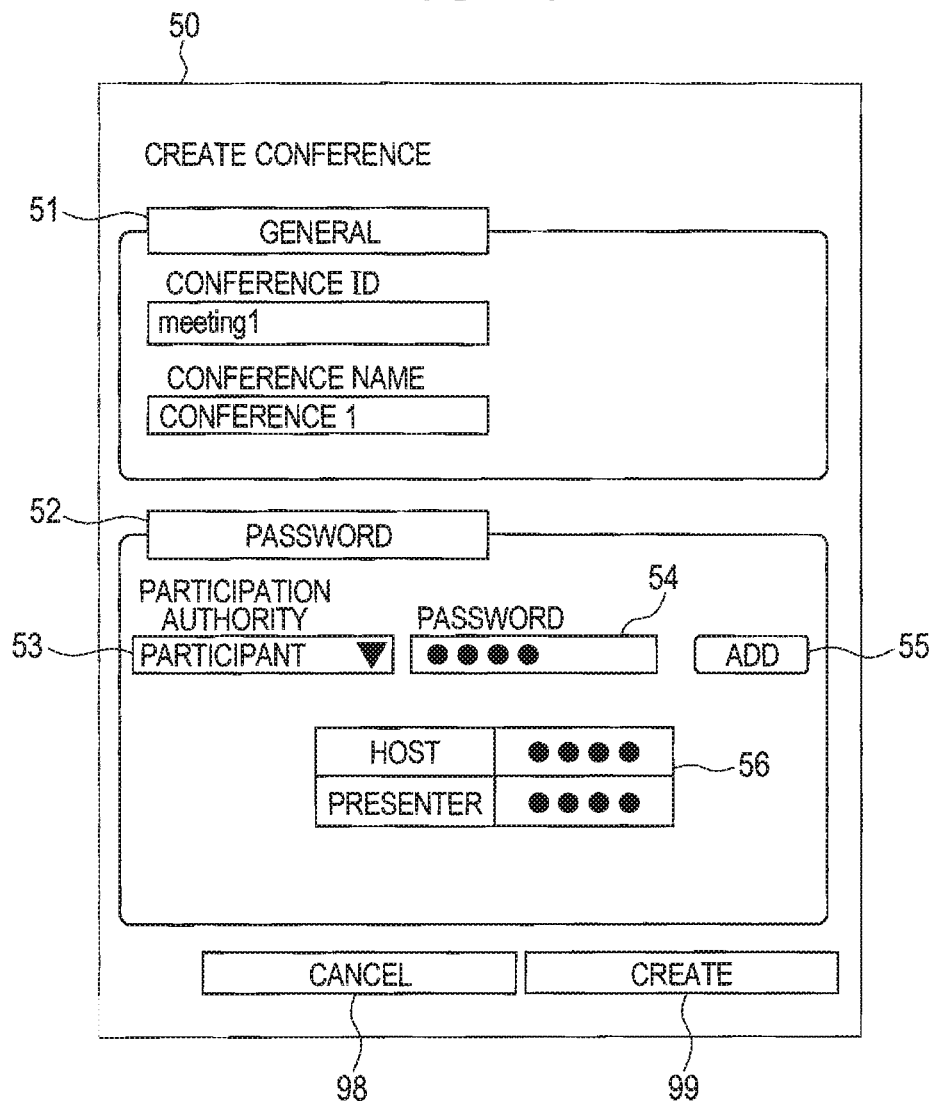
FIG. 6 is a diagram showing a specific example of a second setting screen 50.

As shown in FIG. 6, the second setting screen 50 is a setting screen for executing a third setting method. In the third setting method, the user 13 can set a password in a method different from the first setting method and the second setting method. The second setting screen 50 includes a general information setting section 51, a password information setting section 52, the cancel button 98, and the create button 99. The general information setting section 51 is similar to the general information setting section 41. The password information setting section 52 includes a participation authority selection field 53, an additional password input field 54, an additional display button 55, and an additional password display table 56, as setting items based on the third setting method. The participation authority selection field 53 is a pull-down menu by which one of "host", "presenter", and "participant" is selected as the authority. The additional password input field 54 is an input field for inputting a password corresponding to the authority selected in the participation authority selection field 53. The additional display button 55 and the additional password display table 56 are displayed at the right side and the lower side of the additional password input field 54, respectively.

The additional display button 55 is configured to receive an operation to additionally display the participation authority selection field 53 and the additional password input field 54 in the table 56. When the additional display button 55 is pressed, a combination of the authority selected in the participation authority selection field 53 and the password inputted in the additional password input field 54 is added to the additional password display table 56. At this time, the participation authority selection field 53 is updated to an unselected state, and the additional password input field 54 is updated to an uninputted state. In other words, when the additional display button 55 is pressed, the existing participation authority selection field 53 and additional password input field 54 are added to the additional password display table 56, and participation authority selection field 53 and additional password input field 54 become blank for allowing new inputs.

As shown in FIG. 4, after executing S21, the CPU 111 determines whether the authentication method has been changed (S23). Specifically, when the first setting screen 40 is controlled, through the input device 128, to be displayed in S21 and the authentication method selected in the authentication method selection field 43 in the conference creating terminal is switched, the CPU 121 of the conference creating terminal transmits information indicative of change of the authentication method to the conference server 11. When the conference server 11 receives the information, the CPU 111 determines that the authentication method has been changed (S23: YES).

In this case, the CPU 111 determines whether the authentication method after change is "password input" (S25). Specifically, when the information received by the conference server 11 indicates "password input", the CPU 111 determines that the authentication method after change is "password input" (S25: YES), and controls to display the first setting screen 40 of the first setting method (S27). Specifically, when the first setting screen 40 transmitted in S21 includes screen data of the first setting method and the second setting method, the CPU 111 transmits a signal for switching to the first setting method to the conference creating terminal, thereby controlling the CPU 121 of the conference creating terminal to switchingly display the first setting screen 40 of the first setting method on the Web browser. When the first setting screen 40 transmitted in S21 is screen data of the second setting method, the CPU 111 creates the first setting screen 40 of the first setting method and transmits the created first setting screen 40 to the conference creating terminal, thereby controlling the CPU 121 of the conference creating terminal to display the created first setting screen 40 on the Web browser.

When the information received by the conference server 11 indicates "default role", the CPU 111 determines that the authentication method after change is not "password input" (S25: NO), and controls to display the first setting screen 40 of the second setting method (S29). Specifically, when the first setting screen 40 transmitted in S21 includes screen data of the first setting method and the second setting method, the CPU 111 transmits a signal for switching to the second setting method to the conference creating terminal, thereby controlling the CPU 121 of the conference creating terminal to switchingly display the first setting screen 40 of the second setting method on the Web browser. When the first setting screen 40 transmitted in S21 is screen data of the first setting method, the CPU 111 creates the first setting screen 40 of the second setting method and transmits the created first setting screen 40 to the conference creating terminal, thereby controlling the CPU 121 of the conference creating terminal to display the created first setting screen 40 on the Web browser.

Note that there is a case that the conference creating terminal has a template of the first setting screen 40 that is common to the first setting method and the second setting method (for example, a screen including the general information setting section 41, the authentication method selection field 43, the cancel button 98, and the create button 99). In this case, the CPU 111 may transmit item information of the input fields 44 to 46 in S27, thereby controlling the conference creating terminal to display the first setting screen 40 of the first setting method. Alternatively, the CPU 111 may transmit item information of the guest authority selection field 47 and the guest password input field 48 in S29, thereby controlling the conference creating terminal to display the first setting screen 40 of the second setting method.

Although described above, in S21, S27, and S29, instead of the CPU 111 creating screens, the CPU 111 may transmit various pieces of information for creating screens to the conference creating terminal. In this case, the CPU 111 of the conference server 11 transmits, to the conference creating terminal, information needed for screens created in the conference creating terminal, based on the information received from the conference creating terminal. The CPU 121 of the conference creating terminal may create and display a screen on the Web browser, based on the received various information for creating screens. In a case where the Web browser does not have a function of creating the first setting screen 40 and the second setting screen 50, the CPU 111 may transmit, to the conference creating terminal, an application for adding a function of creating screens to the Web browser (for example, a plug-in). Based on the information received from the conference server 11, the CPU 121 of the conference creating terminal may create and display the entirety of the first setting screen 40 and the second setting screen 50, or may update part of the first setting screen 40 and the second setting screen 50 and display the updated screen.

On the other hand, when the second setting screen 50 is controlled to be displayed in S21 or when it is determined that the authentication method is not switched based on the information received from the conference creating terminal, the CPU 111 determines that there is no change in the authentication method (S23: NO). In this case, the CPU 111 determines whether the create button is ON based on the create button 99 has been pressed in the first setting screen 40 or the second setting screen 50 (S31). After executing S27 or S29, the CPU 111 executes S31. Specifically, when the create button 99 of the first setting screen 40 or the second setting screen 50 has been pressed in the conference creating terminal, the CPU 121 of the conference creating terminal transmits, to the conference server 11, information indicating that the create button 99 has been pressed, that is, information indicating that an input to the create button 99 has been received. When the conference server 11 receives the information, the CPU 111 determines that the create button is ON (S31: YES). When the create button 99 has been pressed, the conference server 11 receives setting information set in the first setting screen 40 or the second setting screen 50 and method information indicative of which one of the first to third setting methods is the setting method of the setting information, and the CPU 111 returns the process to the conference creating process (see FIG. 3). Note that information indicating that an input to the create button 99 has been received is these setting information and method information. And, the CPU 111 may determine whether the create button is ON, based on whether the setting information and the method information have been received.

When the create button is not ON (S31: NO), the CPU 111 determines whether the cancel button is ON based on whether the cancel button 98 has been pressed in the first setting screen 40 or the second setting screen 50, that is, whether an input to the cancel button 98 has been received (S33). Specifically, when the cancel button 98 of the first setting screen 40 or the second setting screen 50 has been pressed in the conference creating terminal, in a similar manner to the case when the create button 99 has been pressed, the CPU 121 of the conference creating terminal transmits, to the conference server 11, information indicating that the cancel button 98 has been pressed. When the conference server 11 receives the information, the CPU 111 determines that the cancel button is ON (S33: YES). In this case, the CPU 111 returns the process to S21. When the cancel button is not ON (S33: NO), the CPU 111 returns the process to S23.

With the above-described process, the user 13 of the conference creating terminal can set the conference room and the password by using one of the first setting screen 40 of the first setting method, the first setting screen 40 of the second setting method, and the second setting screen 50 of the third setting method. When using the first setting screen 40, the user 13 of the conference creating terminal can switch the method between the first setting method and the second setting method to set the conference room and the password.

In the conference setting process shown in S7, the CPU 111 of the conference server 11 executes each process. Alternatively, for example, in S21, the CPU 121 of the conference creating terminal having received the first setting screen 40 or the second setting screen 50 or received display data of the first setting screen 40 or the second setting screen 50 may execute the process of S23 and thereafter. For example, when the CPU 121 receives and executes source information including markup language such as HTML that is display data of the first setting screen 40 or the second setting screen 50 and script such as JAVA™ by the browser stored in the storage 124, the step S23 can be executed without communication with the conference server 11. Whether the authentication method selected in the authentication method selection field 43 is switched in S23 is determined by the CPU 121 of the conference creating terminal. When it is determined that there is a change, the process goes to S25. When it is determined that there is no change or that display data received in S21 is the second setting screen 50, the process goes to S31. In S25, the CPU 121 determines whether the authentication method after change is "password input". When the authentication method after change is "password input", the process goes to S27. When the authentication method after change is not "password input", the process goes to S29. In S27, the CPU 121 displays the first setting screen 40 of the first setting method. For example, when in S21 the CPU 121 displays the first setting screen 40 of the second setting method based on display data of the received first setting screen 40, the first setting screen 40 of the first setting method is displayed in S27. After displaying the first setting screen 40 of the first setting method, the process goes to S31. In S29, the CPU 121 displays the first setting screen 40 of the second setting method. For example, when in S21 the CPU 121 displays the first setting screen 40 of the first setting method based on display data of the received first setting screen 40, in S29 the first setting screen 40 of the second setting method is displayed. After displaying the first setting screen 40 of the second setting method, the process goes to S31. In S31, the CPU 121 determines whether an input to the create button 99 of the first setting screen 40 or the second setting screen 50 has been received. When it is determined that an input to the create button 99 has been received, the following information is transmitted to the conference server 11 depending on the first setting screen 40 or the second setting screen 50 in which the create button 99 is displayed. When the first setting screen 40 of the first setting method is displayed, the conference ID inputted in the general information setting section 41, the authentication method selected in the authentication method selection field 43, and the password inputted in the input fields 44 to 46 are transmitted to the conference server 11. When the first setting screen 40 of the second setting method is displayed, the above mentioned conference ID and authentication method, the authority selected in the guest authority selection field 47, and the password inputted in the guest password input field 48 are transmitted to the conference server 11. When the second setting screen 50 is displayed, the conference ID inputted in the general information setting section 51 and the combination of the authority and password inputted in the additional password display table 56 are transmitted to the conference server 11. These pieces of information transmitted to the conference server 11 are stored in the conference table 30 in a similar manner to the process in S11 described later. That is, transmission of the conference ID, the authority, and the password by the CPU 121 corresponds to a storage controlling process of storing the information in the conference table 30 stored in the storage 114 of the conference server 11.

Figure 3:
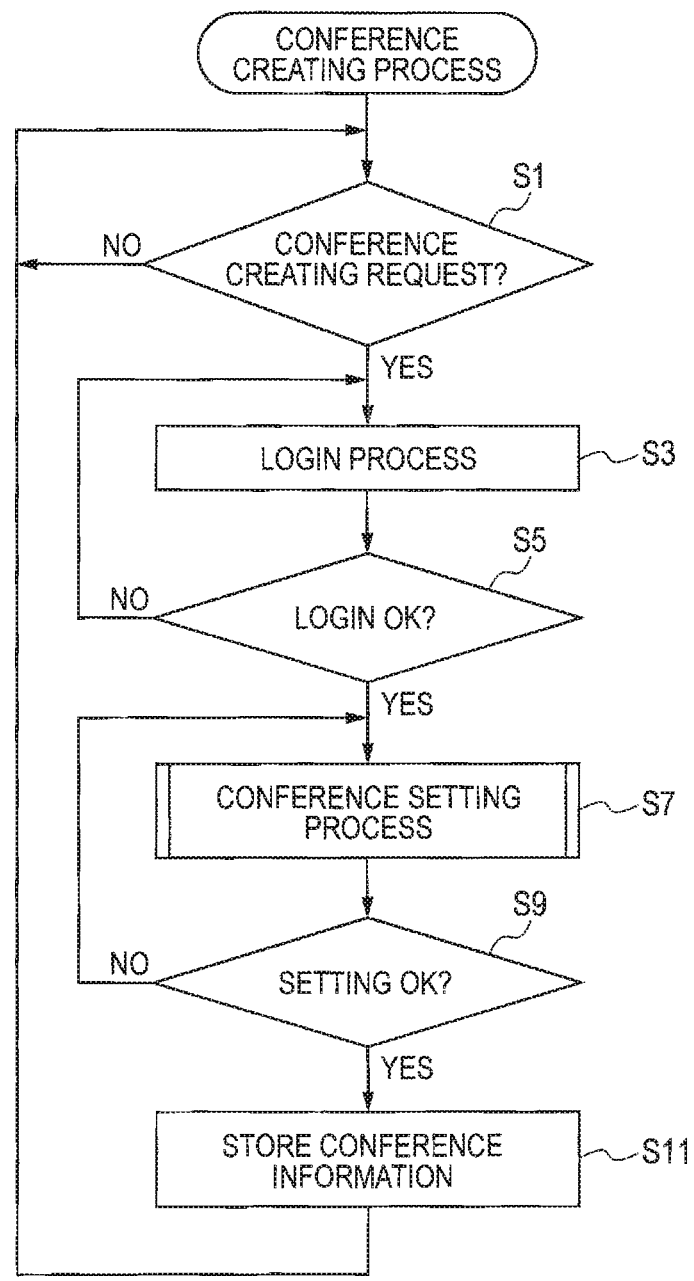
FIG. 3 shows a flowchart of a conference creating process.

As shown in FIG. 3, after executing S7, the CPU 111 determines whether setting is OK (S9). For example, when the create button 99 has been pressed through the input device 128, the CPU 121 of the conference creating terminal transmits, to the conference server 11, setting information set in the first setting screen 40 or the second setting screen 50 and method information indicative of which one of the first to third setting methods the setting method of the setting information is. When it is determined that necessary items in the first setting screen 40 or the second setting screen 50 (for example, conference ID, authority, password, and so on) are set appropriately based on the received setting information, the CPU 111 determines that setting is OK (S9: YES). In this case, the CPU 111 stores, in the conference table 30 (see FIG. 2), conference information that is information set in the first setting screen 40 or the second setting screen 50 (S11), and returns the process to S1. When setting is not OK (S9: NO), the CPU 111 returns the process to S7.

For example, in S11, a storage controlling process is executed in which the conference information is stored in the conference table 30 as described below. When the create button 99 has been pressed in the first setting screen 40 (see FIG. 5), the CPU 111 stores new conference information in the conference table 30 (see FIG. 2) based on the setting information received from the conference creating terminal in S9. With respect to the newly-stored conference information, the CPU 111 sets the conference ID inputted in the general information setting section 41 to the conference ID 30A, and also sets the user ID acquired in S3 to the setter ID 30B.

Further, based on the method information received from the conference creating terminal in S9, the CPU 111 determines whether the first setting screen 40 in which the create button 99 has been pressed is the first setting method. If the above-mentioned first setting screen 40 is the first setting method, as illustrated in the conference information 31 (see FIG. 2), the CPU 111 sets the "password input" selected in the authentication method selection field 43 to the authentication method 30C, and also sets the passwords inputted in the input fields 44 to 46 to the host password 30D, the presenter password 30E, and the participant password 30F, respectively.

On the other hand, the CPU 111 determines whether the first setting screen 40 in which the create button 99 has been pressed is the second setting method based on the method information received from the conference creating terminal in S9. If the above-mentioned first setting screen 40 is the second setting method, as illustrated in the conference information 32 (see FIG. 2), the CPU 111 sets the "default role" selected in the authentication method selection field 43 to the authentication method 30C, sets the authority selected in the guest authority selection field 47 to the guest authority 30H, and sets the password inputted in the guest password input field 48 to the guest password 30G.

Based on the method information received from the conference creating terminal in S9, the CPU 111 determines whether the create button 99 has been pressed in the second setting screen 50 of the third setting method (see FIG. 6). When the create button 99 has been pressed in the second setting screen 50, the CPU 111 stores new conference information in the conference table 30 (see FIG. 2). With respect to the newly-stored conference information, the CPU 111 sets the conference ID inputted in the general information setting section 51 to the conference ID 30A, sets the user ID acquired in S3 to the setter ID 30B, and sets the "password input" to the authentication method 30C. Further, the CPU 111 sets at least one of the host password 30D, the presenter password 30E, and the participant password 30F, depending on the authority and the password set in the additional password display table 56. In the example shown in FIG. 6, respective passwords of "host" and "presenter" set in the additional password display table 56 are set to the host password 30D and the presenter password 30E.

The conference participating process will be described while referring to FIG. 7. First, the CPU 111 determines whether there is a conference participation request (S41). As described above, the CPU 121 of the communication terminal 12 in which an operation for entering a conference room has been performed by using the Web browser, or the CPU 121 of the communication terminal 12 in which an operation of selecting an URL for accessing a conference room has been performed transmits, to the conference server 11, a conference participation request including the conference ID. When the conference server 11 receives the conference participation request, the CPU 111 determines that there is a conference participation request (S41: YES). When there is no conference participation request (S41: NO), the CPU 111 returns the process to S41.

When there is a conference participation request (S41: YES), the CPU 111 determines whether the authentication method is "default role" (S43). Specifically, the CPU 111 identifies conference information for which the conference ID included in the conference participation request is identical to the conference ID 30A, out of conference information stored in the conference table 30 (see FIG. 2). When the authentication method 30C of the identified conference information is "password input", the CPU 111 determines that the authentication method is not "default role" (S43: NO). In this case, the CPU 111 executes a first authority determining process (S45). When the authentication method 30C of the identified conference information is "default role", the CPU 111 determines that the authentication method is "default role" (S43: YES). In this case, the CPU 111 executes a second authority determining process (S47). In the first authority determining process (see FIG. 7) and the second authority determining process (see FIG. 8), authority is set to the user 13 of the entrance requesting terminal. The details will be described later. The entrance requesting terminal is the communication terminal 12 that is the transmission source of the conference participation request.

After executing S45 or S47, the CPU 111 determines whether setting is OK (S49). When "setting NG" is set in the first authority determining process or the second authority determining process as will be described later (S73 in FIG. 8 or S95 in FIG. 9), the CPU 111 determines that setting is not OK (S49: NO). In this case, the CPU 111 controls the entrance requesting terminal to display information indicative of rejection of entrance to the conference room, and returns the process to S41. When it is determined that setting is OK (S49: YES), the CPU 111 stores, in the RAM 113 (see FIG. 1), the information set in the first authority determining process or the second authority determining process as the authority information (S51). After that, the CPU 111 transmits the conference application to the entrance requesting terminal, and returns the process to S41.

With the above-described process, the CPU 121 of the entrance requesting terminal executes the conference application received from the conference server 11, thereby allowing the user 13 to enter the conference room and executing the teleconference. The CPU 111 controls the teleconference executed in the conference room, by a known method. At this time, the CPU 111 gives authority to the user 13 who has entered the conference room, based on the setting information stored in the RAM 113. The user 13 who has entered the conference room can execute various operations during the teleconference within the range of the given authority.

Figure 8:
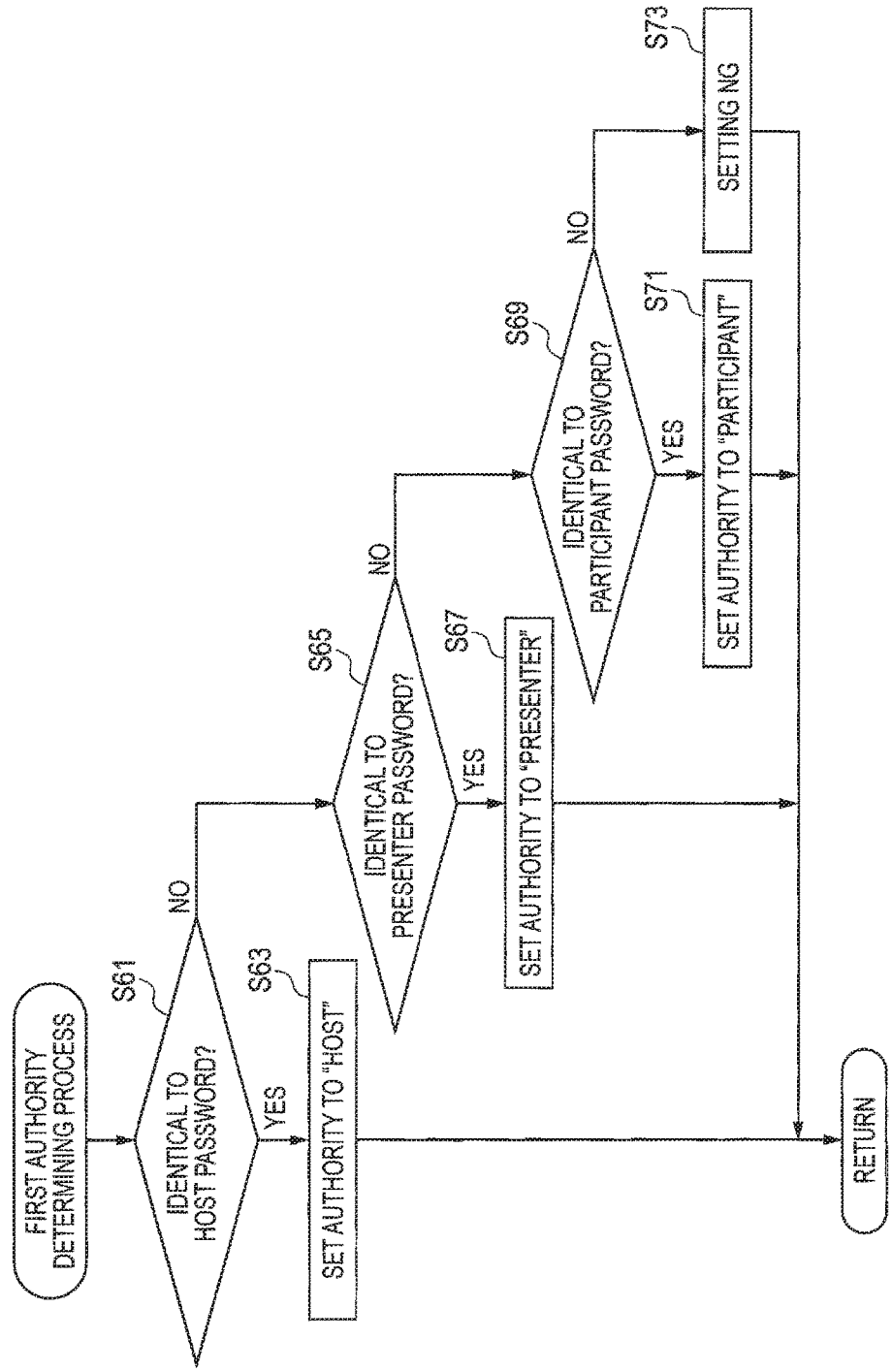
FIG. 8 shows a flowchart of a first authority determining process.

The first authority determining process will be described while referring to FIG. 8. First, the CPU 121 of the entrance requesting terminal starts up the conference application, and displays a login screen in which an entrance password is inputted on the display 126. The CPU 121 of the entrance requesting terminal transmits the entrance password inputted in the login screen to the conference server 11. The CPU 111 determines whether the received entrance password is identical to the host password 30D (see FIG. 2) of the conference information identified in S43 (S61). When the entrance password is identical to the host password 30D (S61: YES), the CPU 111 set the authority given to the user 13 of the entrance requesting terminal to "host" (S63).

When the entrance password is not identical to the host password 30D (S61: NO), the CPU 111 determines whether the entrance password is identical to the presenter password 30E (see FIG. 2) (S65). When the entrance password is identical to the presenter password 30E (S65: YES), the CPU 111 set the authority given to the user 13 of the entrance requesting terminal to "presenter" (S67). When the entrance password is not identical to the presenter password 30E (S65: NO), the CPU 111 determines whether the entrance password is identical to the participant password 30F (see FIG. 2) (S69). When the entrance password is identical to the participant password 30F (S69: YES), the CPU 111 sets the authority given to the user 13 of the entrance requesting terminal to "participant" (S71). When the entrance password is not identical to the participant password 30F (S69: NO), the CPU 111 sets "setting NG" (S73). Note that, in the present embodiment, setting one of the authorities "host", "presenter", or "participant" given to the user 13 of the entrance requesting terminal means, for example, storing, in the RAM 113, the terminal ID for identifying the entrance requesting terminal in association with authority information indicative of one of the authorities "host", "presenter", or "participant".

Figure 7:
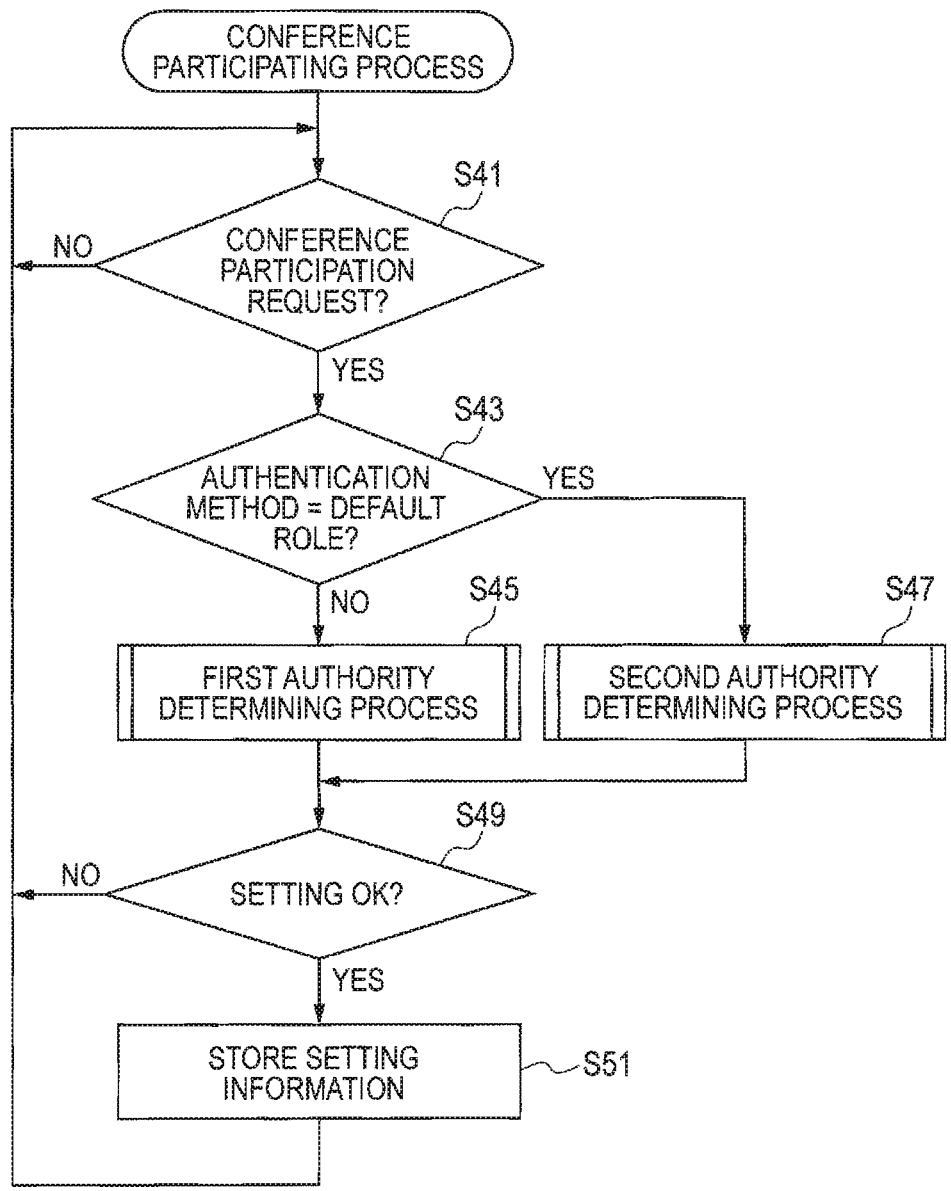
FIG. 7 shows a flowchart of a conference participating process.

After executing one of steps S63, S67, S71, and S73, the CPU 111 returns the process to the conference participating process (see FIG. 7). As described above, the authority information set in one of steps S63, S67, and S71 is stored in the RAM 113 (see FIG. 1) in S51 (see FIG. 7).

Figure 9:
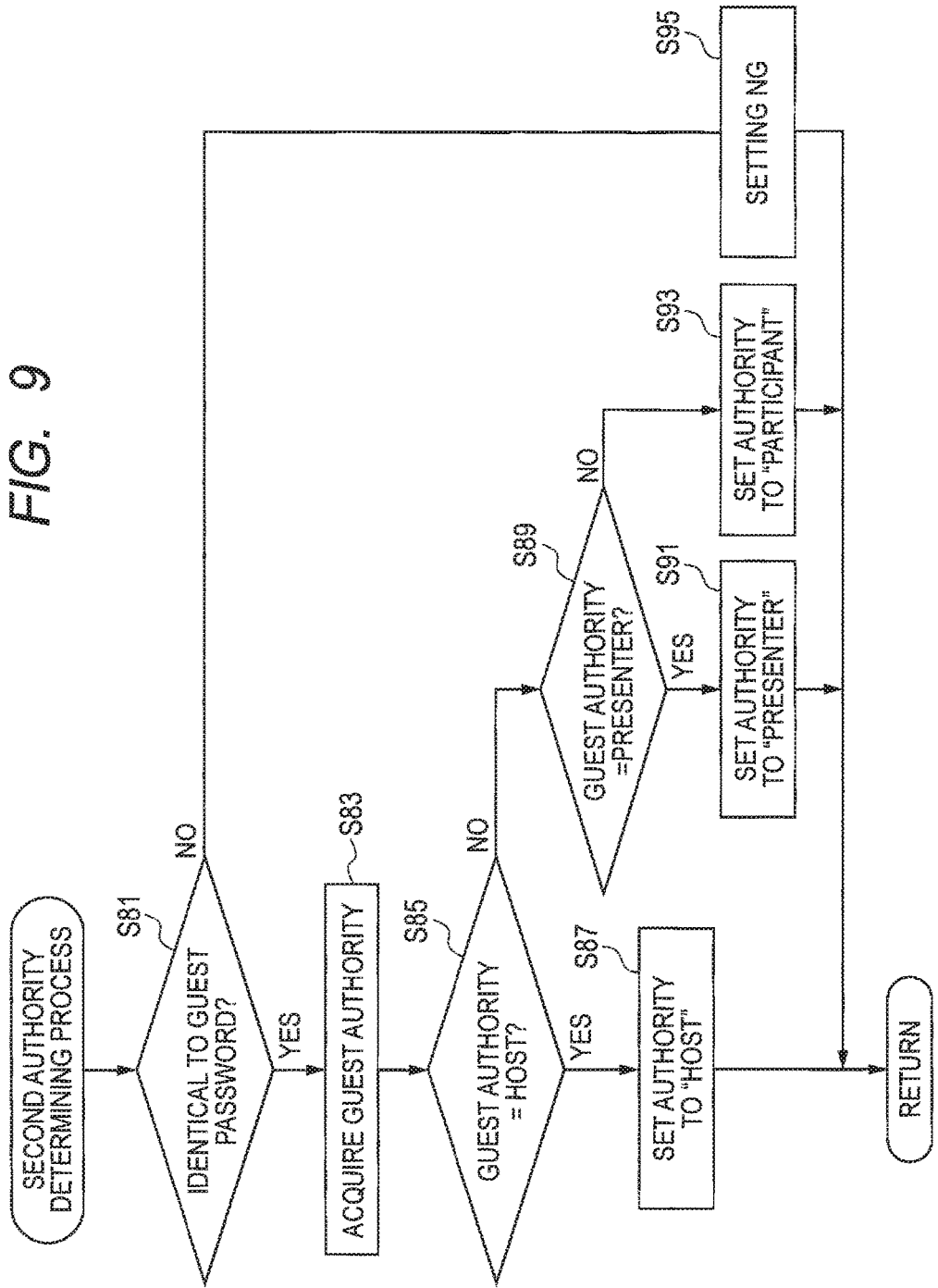
FIG. 9 shows a flowchart of a second authority determining process.

The second authority determining process will be described while referring to FIG. 9. First, the CPU 121 of the entrance requesting terminal starts up the conference application, and displays a login screen in which an entrance password is inputted on the display 126. The CPU 121 of the entrance requesting terminal transmits the entrance password inputted in the login screen to the conference server 11. The CPU 111 determines whether the received entrance password is identical to the guest password 30G (see FIG. 2) of the conference information identified in S43 (S81). When the entrance password is identical to the guest password 30G (S81: YES), the CPU 111 refers to the conference table 30, and acquires the guest authority 30H (see FIG. 2) of the conference information identified in S43 (S83).

The CPU 111 determines whether the acquired guest authority 30H is "host" (S85). When the guest authority 30H is "host" (S85: YES), the CPU 111 sets the authority given to the user 13 of the entrance requesting terminal to "host" (S87). When the guest authority 30H is not "host" (S85: NO), the CPU 111 determines whether the guest authority 30H is "presenter" (S89). When the guest authority 30H is "presenter" (S89: YES), the CPU 111 sets the authority given to the user 13 of the entrance requesting terminal to "presenter" (S91). When the guest authority 30H is not "presenter" (S89: NO), the CPU 111 sets the authority given to the user 13 of the entrance requesting terminal to "participant" (S93). When the entrance password is not identical to the guest password 30G (S81: NO), the CPU 111 sets "setting NG" (S95).

After executing one of steps S87, S91, S93, and S95, the CPU 111 returns the process to the conference participating process (see FIG. 7). As described above, the authority information set in one of steps S87, S91, and S93 is stored in the RAM 113 (see FIG. 1) in S51 (see FIG. 7).

In the above-described embodiment, the CPU 121 of the entrance requesting terminal starts up the conference application and displays the login screen in which the entrance password is inputted on the display 126. However, for example, an entrance password may be included in a URL for accessing the conference room identified by the conference ID, the URL being received through electronic mail and so on. In this case, the accessed URL includes the entrance password inputted in the login screen, which is used in the first authority determining process and the second authority determining process.

Figure 10:
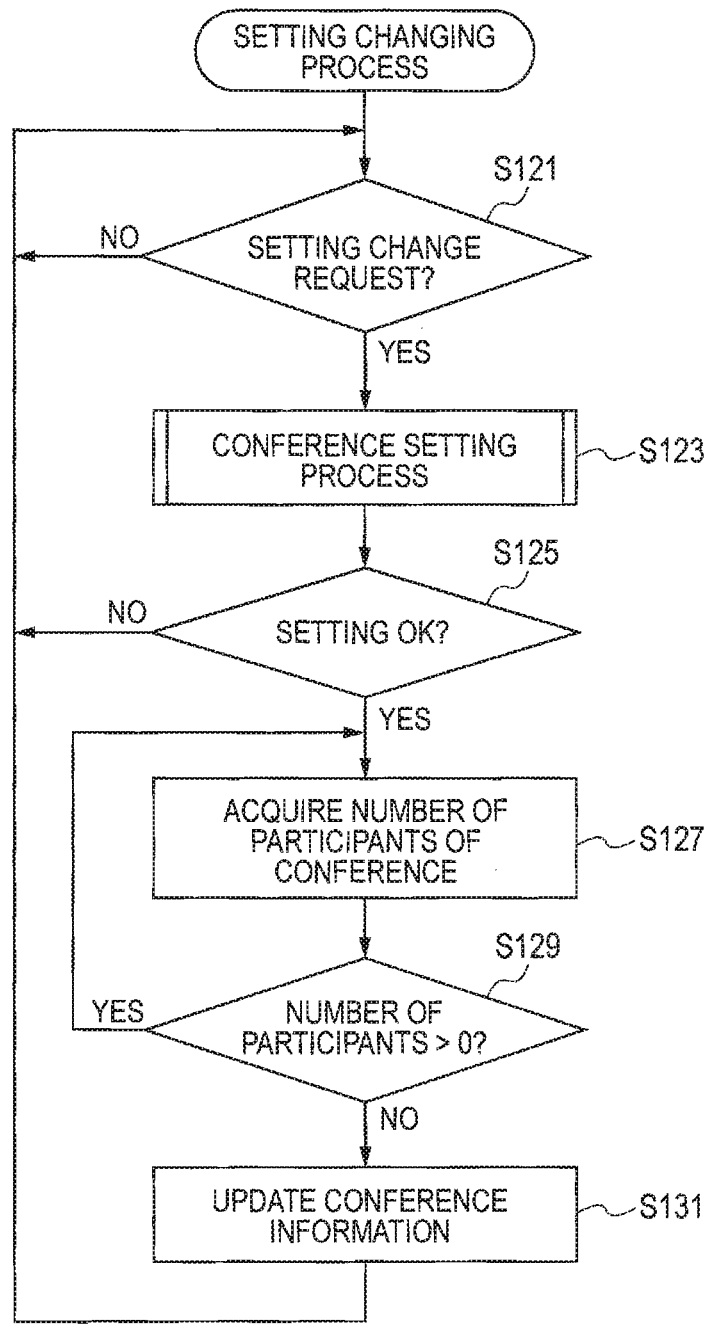
FIG. 10 shows a flowchart of a setting changing process.

The setting changing process will be described while referring to FIG. 10. First, the CPU 111 determines whether there is a setting change request (S121). For example, the user 13 having set the conference room operates the communication terminal 12 to start up the Web browser, and accesses a particular URL to give an instruction to change the conference information. In this case, the CPU 121 of the communication terminal 12 transmits a setting change request to the conference server 11. When the conference server 11 receives the setting change request, the CPU 111 determines that there is a setting change request (S121: YES), and executes the login process in a similar manner to S3 (see FIG. 3). Preferably, the CPU 111 performs authentication by the conference ID and the setter ID, and permits only the setting change request of the user 13 who has set the conference. When login is OK, the CPU 111 executes the conference setting process in a similar manner to S7 (see FIG. 3) (S123). When there is no setting change request (S121: NO), the CPU 111 returns the process to S121.

For example, in the first setting screen 40 (see FIG. 5), the user 13 of the setting changing terminal sets the conference ID and the conference name of the already-set conference room to the general information setting section 41. The setting changing terminal is the communication terminal 12 that is the transmission source of the setting change request. Further, the user 13 of the setting changing terminal sets new authority and password in the password information setting section 42 and presses the create button 99. Alternatively, in the second setting screen 50 (see FIG. 6), the user 13 of the setting changing terminal sets the conference ID and the conference name of the already-set conference room to the general information setting section 51. Further, the user 13 of the setting changing terminal sets new authority and password in the password information setting section 52, and presses the create button 99. The CPU 121 of the setting changing terminal transmits, to the conference server 11, the information set in the first setting screen 40 or the second setting screen 50 as described above. In S123, the CPU 111 stores the received information in the RAM 113 without changing the conference ID.

After executing S123, in a similar manner to S9 (see FIG. 3), the CPU 111 determines whether setting is OK (S125). When the setting is OK (S125: YES), the CPU 111 acquires the number of participants of a target conference room (S127). The target conference room is a conference room for which a new password and so on are set in S123. Specifically, when a teleconference is being executed in the target conference room, the CPU 111 acquires the number of the communication terminals 12 for which a session is established with the target conference room as the number of participants of the target conference room. When no teleconference is being executed in the target conference room, or when there is no communication terminal 12 for which a session is established with the target conference room, the CPU 111 acquires "0" as the number of participants of the target conference room. When the setting is not OK (S125: NO), the CPU 111 returns the process to S121.

The CPU 111 determines whether the teleconference held in the target conference room acquired in S127 is ended. Specifically, the CPU 111 determines whether the number of participants of the target conference room acquired in S127 is larger than "0" (S129). When the number of participants of the target conference room is larger than "0" (S129: YES), the teleconference is not ended in the target conference room, and hence the CPU 111 returns the process to S127. When the number of participants of the target conference room is "0" (S129: NO), the teleconference is ended in the target conference room. In this case, the CPU 111 updates the conference information of the target conference room stored in the conference table 30 (see FIG. 2) based on the information stored in the RAM 113 in S123 (S131), and returns the process to S121.

With the above-described processes, the user 13 having set the conference room can change the conference information of the set conference room. The new password and so on set by the user 13 are reflected in the conference table 30, after the teleconference conducted in the target conference room is finished.

Second Embodiment: Processes Executed by Teleconference System 1

The processes executed by the teleconference system 1 in a second embodiment will be described while referring to FIGS. 11 and 12. In the following descriptions, the points different from the first embodiment will be described. In the second embodiment, the first setting screen 40 of the first setting method is the same as the first setting screen 40 shown in the left side of FIG. 5. On the other hand, the first setting screen 40 of the second setting method (see FIG. 11) is different from the first setting screen 40 shown in the right side of FIG. 5 in the points described below.

Figure 11:
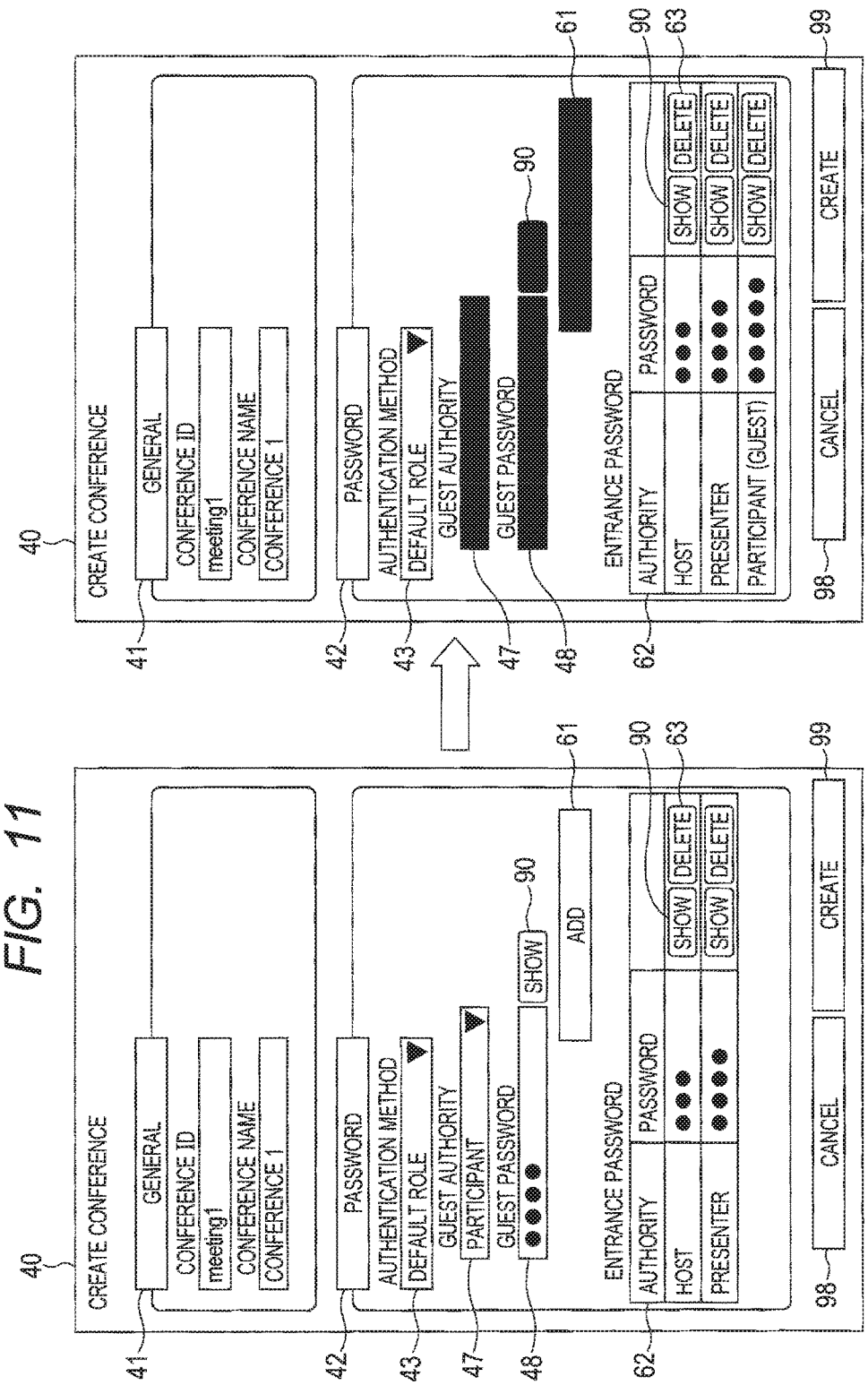
FIG. 11 is a diagram showing a specific example of the first setting screen 40 according to a second embodiment.

In the first setting screen 40 of the second setting method shown in FIG. 11, in a similar manner to the first setting screen 40 shown in the right side of FIG. 5, the authentication method selection field 43, the guest authority selection field 47, the guest password input field 48, and the show button 90 are displayed in the password information setting section 42. Further, an additional display button 61 and an entrance password display table 62 are displayed in the password information setting section 42. The additional display button 61 is displayed at the lower side of the guest password input field 48. The entrance password display table 62 is displayed at the lower side of the additional display button 61.

In the entrance password display table 62, passwords for respective authorities, which are different from the guest authority, are displayed. The passwords for respective authorities may be inputted in the input fields 44 to 46 of the first setting screen 40 of the first setting method shown in the left side of FIG. 5. For example, assume that, after the respective passwords are inputted in the input fields 44 and 45 of the first setting screen 40 shown in the left side of FIG. 5, the authentication method is switched from "password input" to "default role" in the authentication method selection field 43. In this case, as shown in FIG. 11, the passwords inputted respectively in the input fields 44 and 45 are added to the entrance password display table 62 as the "host" password and the "presenter" password. Further, when the additional display button 61 is pressed, a combination of the authority selected in the guest authority selection field 47 and the password inputted in the guest password input field 48 is added to the entrance password display table 62 as the guest authority and the guest password.

A show button 90 and a delete button 63 are displayed at the right side of passwords of respective authorities displayed in the entrance password display table 62. The show button 90 is for switching the display mode of the corresponding password. When the delete button 63 is pressed, the corresponding authority and password are deleted from the entrance password display table 62.

In the second embodiment, the CPU 111 of the conference server 11 executes a first screen displaying process (see FIG. 12) as part of S27 in the conference setting process (see FIG. 3). The first screen displaying process is a process of controlling to display the first setting screen 40 of the second setting method shown in FIG. 11. That is, the CPU 111 executes the first screen displaying process as part of the process included in S27, in a case where the first setting screen 40 of the second setting method is displayed on the conference creating terminal by the process of S27. In the first screen displaying process, the CPU 111 creates the updated first setting screen 40 or the update information in response to a screen operation performed on the conference creating terminal, and transmits the data to the conference creating terminal, thereby controlling the CPU 121 of the conference creating terminal to update the first setting screen 40 that is being displayed.

Figure 12:
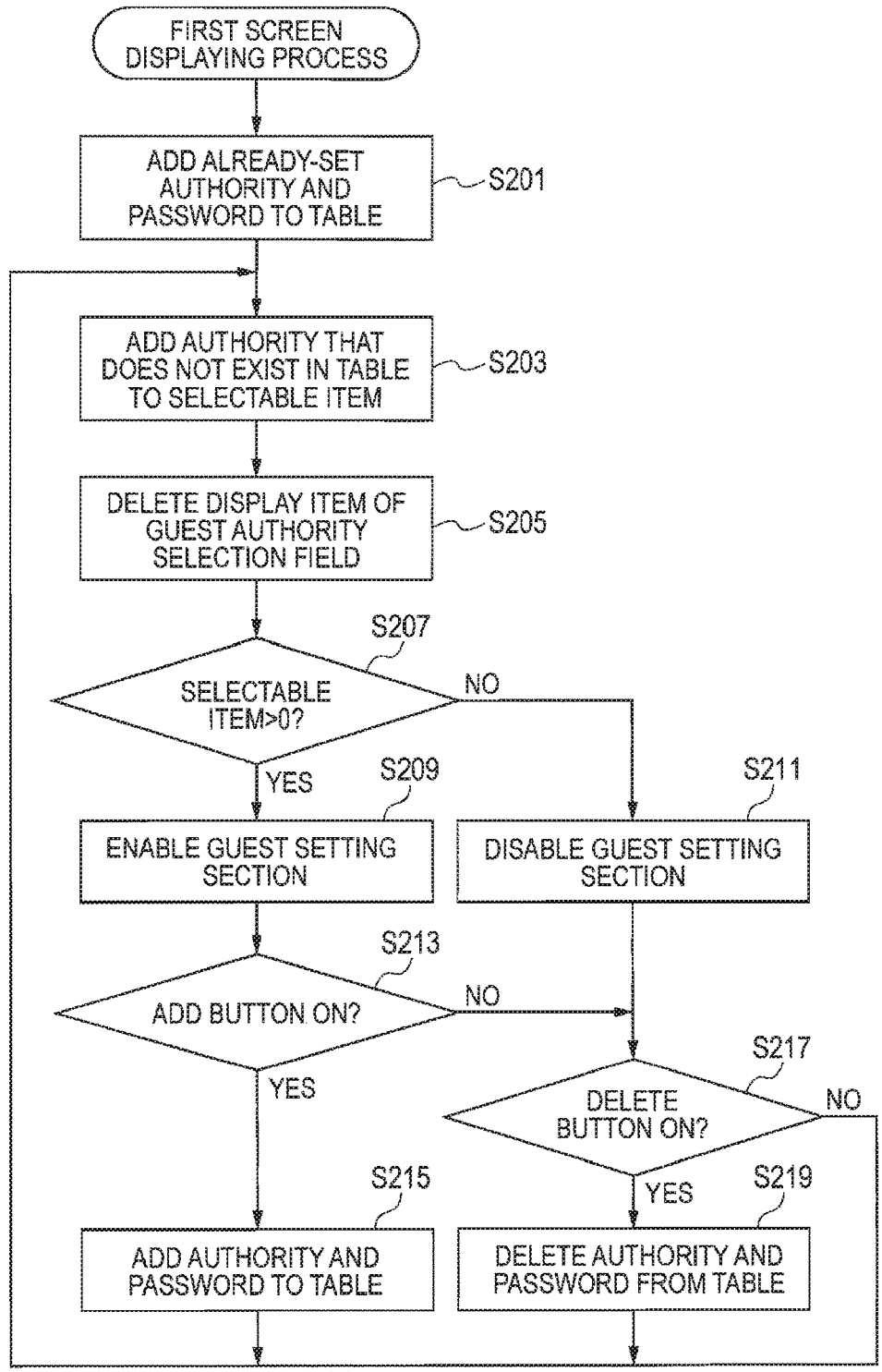
FIG. 12 shows a flowchart of a first screen displaying process.

As shown in FIG. 12, in the first screen displaying process, first, the CPU 111 adds the already-set authority and password to the entrance password display table 62 (S201). For example, when passwords for respective authorities are set in the first setting screen 40 of the first setting method before the first setting screen 40 of the second setting method is displayed, the CPU 111 adds the already-set authority and password to the entrance password display table 62.

Next, the CPU 111 adds authority that does not exist in the entrance password display table 62 of all the authorities to selectable item (S203). The selectable item is selectable authority that is displayed as pull-down in the guest authority selection field 47. Next, the CPU 111 deletes the displayed item of the guest authority selection field 47 (S205). By this process, the guest authority selection field 47 is updated to an unselected state.

Next, the CPU 111 determines whether the selectable item is more than "0" (S207). When the selectable item is more than "0" (S207: YES), the CPU 111 enables a guest setting section (S209). The guest setting section includes the guest authority selection field 47, the guest password input field 48, the show button 90 located at the right side of the guest password input field 48, and the additional display button 61. When the guest setting section is enabled, the CPU 111 permits an operation to the guest setting section by the user 13. As shown in the left side of FIG. 11, the CPU 111 creates the first setting screen 40 such that the first setting screen 40 includes the guest setting section of regular display in which an operation of the user 13 is received.

When the selectable item is "0" (S207: NO), the CPU 111 disables the guest setting section (S211). When the guest setting section is disabled, the CPU 111 restricts an operation to the guest setting section by the user 13. As shown in the right side of FIG. 11, the CPU 111 creates the first setting screen 40 such that the first setting screen 40 includes the guest setting section of special display in which an operation of the user 13 is not received.

After executing S209, the CPU 111 determines whether an add button is ON (S213). Specifically, when the additional display button 61 has been pressed in the conference creating terminal, the CPU 121 of the conference creating terminal transmits, to the conference server 11, information indicating that the additional display button 61 has been pressed, the guest authority selected in the guest authority selection field 47, and the password inputted in the guest password input field 48. When the conference server 11 receives these pieces of information, the CPU 111 determines that the add button is ON (S213: YES), and adds the combination of the authority selected in the guest authority selection field 47 and the password inputted in the guest password input field 48 to the entrance password display table 62 as the guest authority and the guest password (S215).

After executing S211 or when the add button is not ON (S213: NO), the CPU 111 determines whether a delete button is ON (S217). Specifically, when the delete button 63 has been pressed in the conference creating terminal, the CPU 121 of the conference creating terminal transmits, to the conference server 11, information indicating that the delete button 63 has been pressed and the authority and password corresponding to the pressed delete button 63. When the conference server 11 has received these pieces of information, the CPU 111 determines that the delete button is ON (S217: YES), and deletes the authority and password corresponding to the pressed delete button 63 from the entrance password display table 62 (S219). After executing S215 or S219 or when the delete button is not ON (S217: NO), the CPU 111 returns the process to S203.

By the above-described process, for example, when the additional display button 61 has been pressed in the first setting screen 40 shown in the left side of FIG. 11, the first setting screen 40 shown in the right side of FIG. 11 is created by the CPU 111 and is displayed on the conference creating terminal. In the first setting screen 40 shown in the right side of FIG. 11, "participant" that is the guest authority and the guest password are added to the entrance password display table 62. Because all the authorities are added to the entrance password display table 62, the guest setting section is disabled.

On the other hand, when the delete button 63 corresponding to the password of "participant" has been pressed in the first setting screen 40 shown in the right side of FIG. 11, "participant" that is the guest authority and the guest password are deleted from the entrance password display table 62. In this case, the first setting screen 40 shown in the left side of FIG. 11 is created, and the guest setting section is enabled. In the guest authority selection field 47, the display item is deleted, and "participant" becomes selectable from the pull-down menu.

Note that, when the create button 99 has been pressed in the first setting screen 40 shown in the right side of FIG. 11, the CPU 111 stores new conference information in the conference table 30 (see FIG. 2) (S11 in FIG. 3). As illustrated in the conference information 33 (see FIG. 2), the CPU 111 sets the "default role" selected in the authentication method selection field 43 to the authentication method 30C. The CPU 111 sets respective passwords of "host" and "presenter" added to the entrance password display table 62 to the host password 30D and the presenter password 30E, respectively. The CPU 111 sets the password of "participant" added to the entrance password display table 62 to the guest password 30G, and sets "participant" to the guest authority 30H.

Third Embodiment: Processes Executed in Teleconference System 1

The processes executed by the teleconference system 1 in a third embodiment will be described while referring to FIGS. 13 to 15. In the following descriptions, the points different from the first and second embodiments will be described. In the third embodiment, the first setting screen 40 of the first setting method is the same as the first setting screen 40 shown in the left side of FIG. 5. On the other hand, the first setting screen 40 of the second setting method (see FIG. 13) is different from the first setting screen 40 shown in the right side of FIG. 5 in the points described below.

Figure 13:
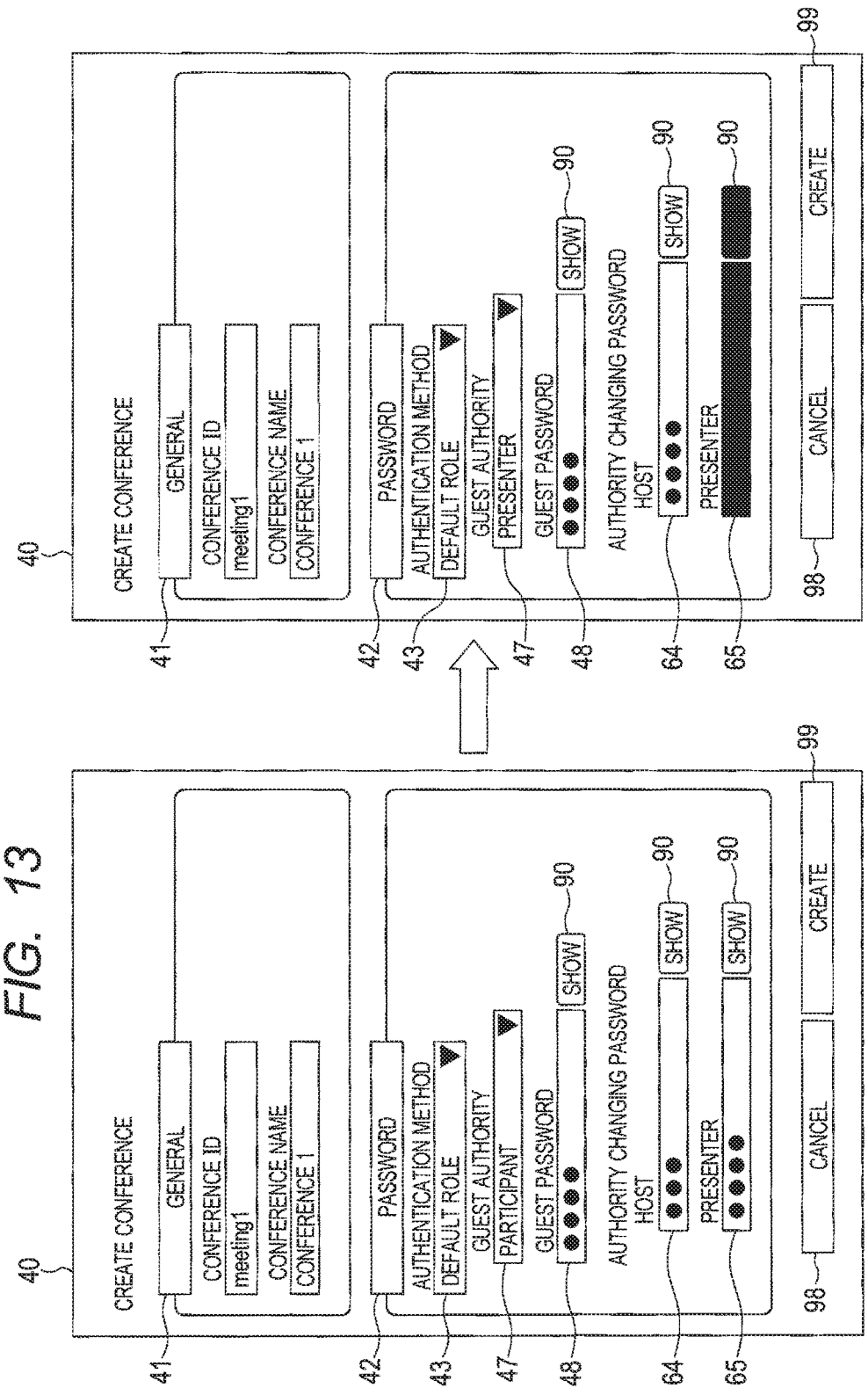
FIG. 13 is a diagram showing a specific example of the first setting screen 40 according to a third embodiment.

In the first setting screen 40 of the second setting method shown in FIG. 13, in a similar manner to the first setting screen 40 shown in the right side of FIG. 5, the authentication method selection field 43, the guest authority selection field 47, the guest password input field 48, and the show button 90 are displayed in the password information setting section 42. Further, the host password input field 64 and the presenter password input field 65 are displayed in the password information setting section 42. The host password input field 64 and the presenter password input field 65 are displayed at the lower side of the guest password input field 48.

In the host password input field 64 and the presenter password input field 65 in the first setting screen 40 of the second setting method, a host password and a presenter password are set in addition to the guest password. The show button 90 for switching the display mode of the host password input field 64 is displayed at the right side of the host password input field 64. The show button 90 for switching the display mode of the presenter password input field 65 is displayed at the right side of the presenter password input field 65.

In the third embodiment, the CPU 111 of the conference server 11 executes a second screen displaying process (see FIG. 14) as part of S27 in the conference setting process (see FIG. 3). The second screen displaying process is a process for controlling to display the first setting screen 40 of the second setting method shown in FIG. 13. That is, when the first setting screen 40 of the second setting method is displayed on the conference creating terminal in S27, the CPU 111 executes the second screen displaying process as part of the process executed in S27. In the second screen displaying process, in response to a screen operation performed on the conference creating terminal, the CPU 111 creates the updated first setting screen 40 or the update information and transmits the data to the conference creating terminal, thereby controlling the CPU 121 of the conference creating terminal to update the first setting screen 40 that is being displayed.

Figure 14:
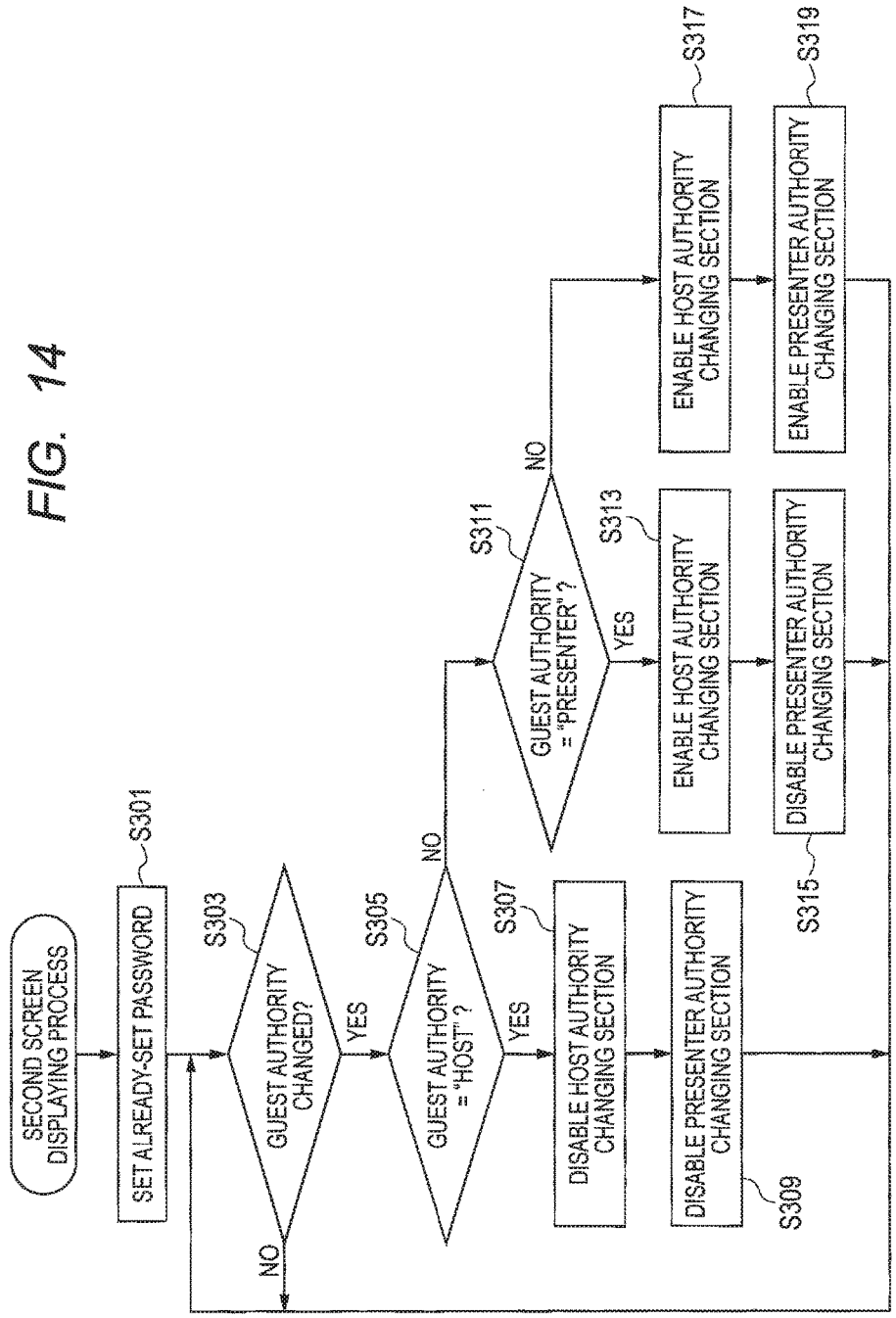
FIG. 14 shows a flowchart of a second screen displaying process.

As shown in FIG. 14, in the second screen displaying process, first, the CPU 111 sets the password of each already-set authority to the password information setting section 42 (S301). For example, when the password of each authority is set in the first setting screen 40 of the first setting method before displaying the first setting screen 40 of the second setting method, the CPU 111 sets the password of each authority to the password information setting section 42 as the already-set authority. More specifically, when a password is already inputted in the input field 44 of the first setting screen 40 of the first setting method before displaying the first setting screen 40 of the second setting method, the CPU 111 copies that password to the host password input field 64. Similarly, when a password is already inputted in the input field 45, the CPU 111 copies that password to the presenter password input field 65.

Next, the CPU 111 determines whether the guest authority selected in the guest authority selection field 47 has been changed (S303). Specifically, when selection of the guest authority has been changed in the guest authority selection field 47 in the conference creating terminal, the CPU 121 of the conference creating terminal transmits, to the conference server 11, information indicative of the guest authority after change. That is, the conference server 11 extracts the authority inputted in the guest authority selection field 47 from the information received from the conference creating terminal. When the conference server 11 has received that information, the CPU 111 determines that the guest authority has been changed (S303: YES), and determines whether the guest authority after change is "host" (S305). When the guest authority after change is "host" (S305: YES), the CPU 111 disables a host authority changing section and a presenter authority changing section (S307, S309). The host authority changing section includes the host password input field 64 and the show button 90 located at the right side thereof. The presenter authority changing section includes the presenter password input field 65 and the show button 90 located at the right side thereof.

When the host authority changing section and the presenter authority changing section are disabled, the CPU 111 restricts an operation, by the user 13, to set a password to the host authority changing section and the presenter authority changing section. For example, the CPU 111 creates the first setting screen 40 such that the first setting screen 40 includes the host authority changing section and the presenter authority changing section of special display in which an operation by the user 13 is not received (see the password information setting section 42A in FIG. 15).

When the guest authority after change is not "host" (S305: NO), the CPU 111 determines whether the guest authority after change is "presenter" (S311). When the guest authority after change is "presenter" (S311: YES), the CPU 111 enables the host authority changing section (S313), and disables the presenter authority changing section (S315). When the host authority changing section is enabled, the CPU 111 permits an operation to the host authority changing section by the user 13. As illustrated in the right side of FIG. 13, the CPU 111 creates the first setting screen 40 such that the first setting screen 40 includes the host authority changing section of regular display in which an operation of the user 13 is received, and the presenter authority changing section of special display in which an operation of the user 13 is not received (see the password information setting section 42B in FIG. 15). In the present embodiment, to enable or disable means that, for example, the CPU 111 deletes or adds disabling attribute information to a corresponding portion of the display data, for example, a corresponding input tag.

When the guest authority after change is not "presenter" (S311: NO), the CPU 111 enables the host authority changing section and the presenter authority changing section (S317, S319). When the presenter authority changing section is enabled, the CPU 111 permits an operation to the presenter authority changing section by the user 13. As illustrated in the left side of FIG. 13, the CPU 111 creates the first setting screen 40 such that the first setting screen 40 includes the host authority changing section and the presenter authority changing section of regular display in which an operation of the user 13 is received (see the password information setting section 42C in FIG. 15). After executing one of steps S309, S315, and S319, the CPU 111 returns the process to S303.

Figure 15:
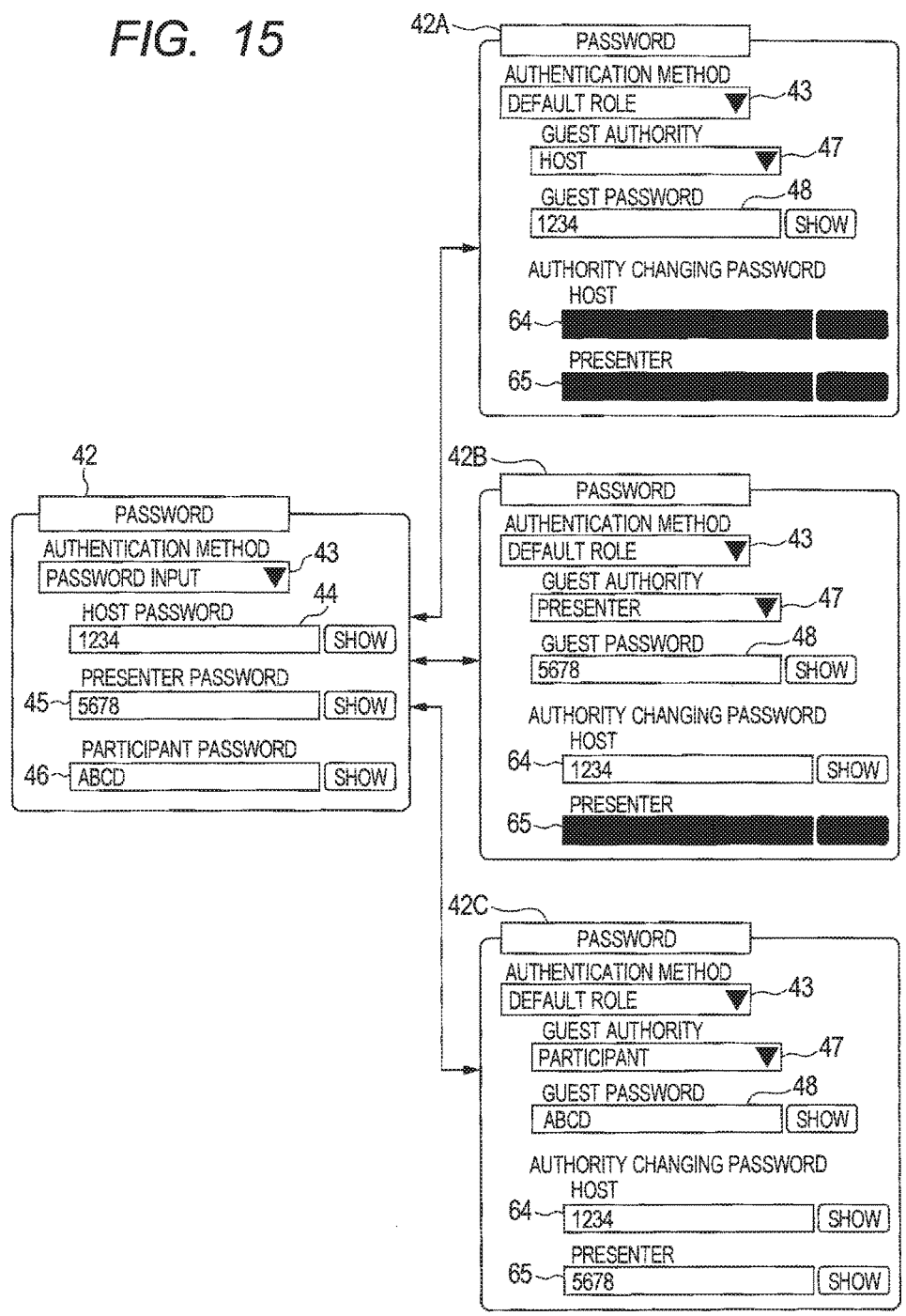
FIG. 15 is an explanatory diagram showing a relationship between the first setting screen 40 of a first setting method and the first setting screen 40 of a second setting method.

For example, when the authentication method is switched from "password input" to "default role" in the authentication method selection field 43 in the first setting screen 40 of the first setting method shown in the left side of FIG. 15 by the above-described processes, the first setting screen 40 of the second setting method shown in the right side of FIG. 15 is created by the CPU 111, and is displayed on the conference creating terminal. More specifically, as shown in the password information setting section 42A at the right side of FIG. 15, when "host" is selected in the guest authority selection field 47, both of the host authority changing section and the presenter authority changing section are disabled. As shown in the password information setting section 42B at the right side of FIG. 15, when "presenter" is selected in the guest authority selection field 47, the host authority changing section is enabled, and the presenter authority changing section is disabled. As shown in the password information setting section 42C at the right side of FIG. 15, when "participant" is selected in the guest authority selection field 47, both of the host authority changing section and the presenter authority changing section are enabled. That is, out of the host authority changing section and the presenter authority changing section, the changing section of authority equal to or lower than the authority selected in the guest authority selection field 47 is disabled (i.e., setting of a password is restricted).

The user 13 of the conference creating terminal can set the password for each authority in addition to the guest password in the first setting screen 40 of the second setting method. The first setting screen 40 of the second setting method displayed on the conference creating terminal reflects the password that is already set in the first setting screen 40 of the first setting method. Thus, the user 13 of the conference creating terminal can save time and effort to set a password. The user 13 of the conference creating terminal may change the password reflected in the first setting screen 40 of the second setting method, in the first setting screen 40 of the second setting method.

Conversely, when the authentication method is switched from "default role" to "password input" in the authentication method selection field 43 in the first setting screen 40 of the second setting method shown in the right side of FIG. 15, an existing password may be set to the first setting screen 40 of the first setting method shown in the left side of FIG. 15. For example, the CPU 111 may set the password inputted in the guest password input field 48 of the password information setting section 42A to one of the input fields 44 to 46 corresponding to the guest authority in the first setting screen 40 shown in the left side of FIG. 15. The CPU 111 may set the password set in the host password input field 64 to the input field 44. The CPU 111 may set the password set in the presenter password input field 65 to the input field 45.

Note that, when the create button 99 has been pressed in the first setting screen 40 shown in the left side of FIG. 13, the CPU 111 stores new conference information in the conference table 30 (see FIG. 2) (S11 in FIG. 3). The CPU 111 sets "default role" selected in the authentication method selection field 43 to the authentication method 30C, sets the authority selected in the guest authority selection field 47 to the guest authority 30H, and sets the password inputted in the guest password input field 48 to the guest password 30G. Further, the CPU 111 sets the password set in the host password input field 64 to the host password 30D. The CPU 111 sets the password set in the presenter password input field 65 to the presenter password 30E.

An authority changing process will be described while referring to FIG. 16. For example, the user 13 having set the conference room can notify the other users 13 who have entered the conference room about passwords of various authorities during the teleconference. In other words, the CPU 121 of conference creating terminal transmits passwords of various authorities to the communication terminals 12 during the teleconference. Further, the user 13 having set the conference room can notify the other users 13 about passwords of a plurality of different authorities, by electronic mail for conference invitation. According to the authority changing process, for example, the user 13 having entered the conference room with the authority of "participant" can change his or her authority by using the notified password.

First, the CPU 111 determines whether there is an authority changing request (S101). For example, when the user 13 instructs to change authority by using the conference application during the teleconference, the CPU 121 of the communication terminal 12 transmits, to the conference server 11, an authority changing request including the password inputted by the user 13. The password included in the authority changing request is the password notified as mentioned above, and functions as the authority changing password. That is, the password inputted in the host password input field 64 or the presenter password input field 65 displayed in the first setting screen 40 of the second setting method shown in FIG. 13 is the authority changing password. When the authority changing request is received by the conference server 11, the CPU 111 determines that there is an authority changing request (S101: YES). When there is no authority changing request (S101: NO), the CPU 111 repeats the process of S101.

When there is an authority changing request (S101: YES), the CPU 111 executes the first authority determining process (see FIG. 8) (S103). In S103, in a similar manner to S45 (see FIG. 7), one of "host", "presenter", "participant", and "setting NG" is set depending on the password included in the authority changing request (see S63, S67, S71, S73 in FIG. 8). After executing S103, in a similar manner to S49 (see FIG. 7), the CPU 111 determines whether the setting is OK (S105). When the setting is OK (S105: YES), the CPU 111 changes authority of the user 13 of an authority changing terminal to the authority set in S103 (S107). The authority changing terminal is the communication terminal 12 that is the transmission source of the authority changing request. Specifically, the CPU 111 updates authority information of the user 13 of the authority changing terminal stored in the RAM 113 to the authority information set in S103. After executing S107 or when the setting is not OK (S105: NO), the CPU 111 returns the process to S101.

By the above-described process, for example, when the communication terminal 12 of the user 13 to which authority "participant" is given transmits an authority changing request including a host password to the conference server 11 during a teleconference, the authority of the user 13 is changed from "participant" to "host".

Fourth Embodiment: Process Executed by Teleconference System 1

Processes executed by the teleconference system 1 in a fourth embodiment will be described while referring to FIGS. 17 and 18. In the following descriptions, the points different from the first to third embodiments will be described. In the fourth embodiment, the first setting screen 40 of the first setting method is the same as the first setting screen 40 shown in the left side of FIG. 5. On the other hand, the first setting screen 40 of the second setting method (see FIG. 17) is different from the first setting screen 40 shown in the right side of FIG. 5 in the points described below.

Figure 17:
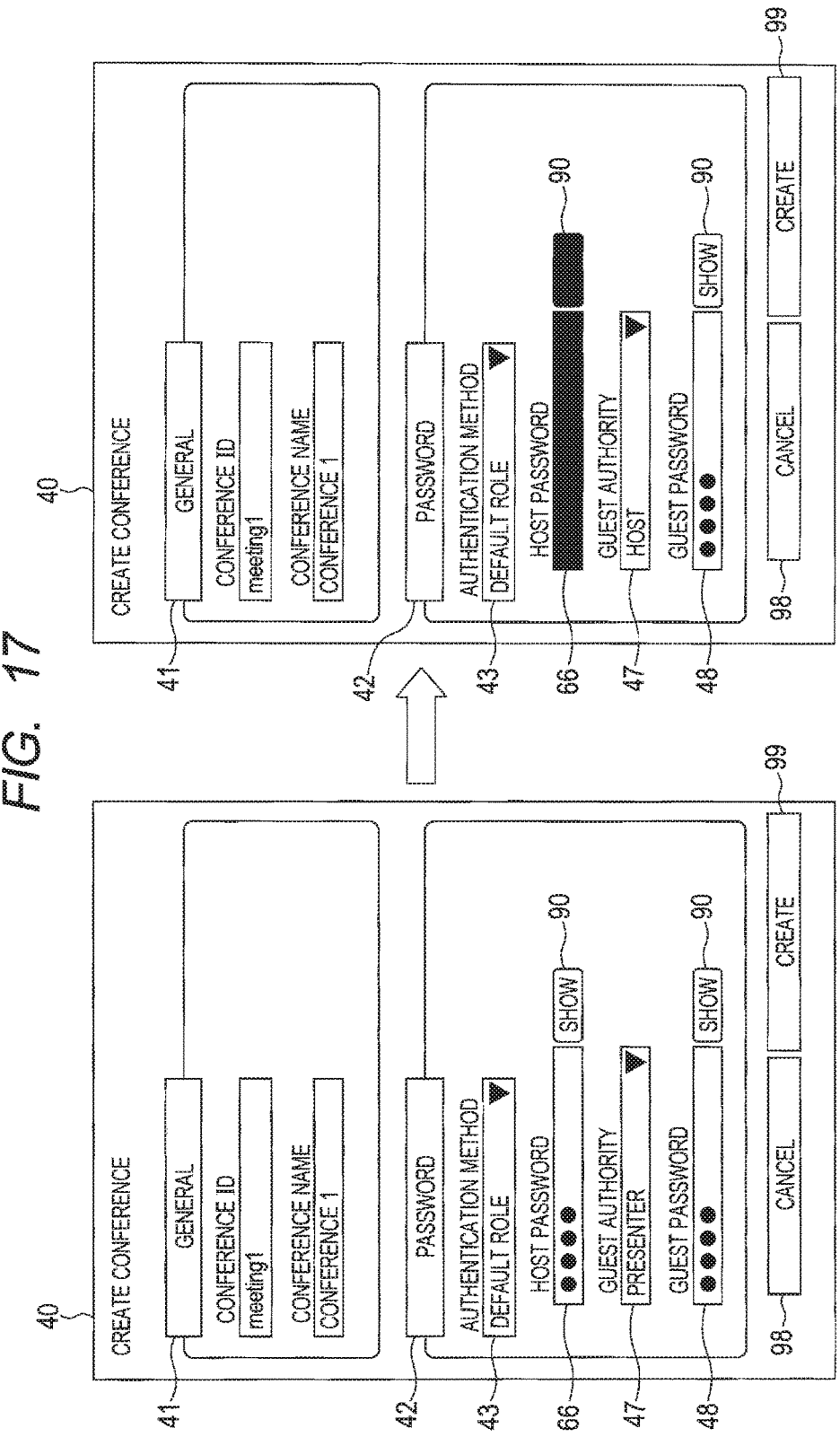
FIG. 17 is a diagram showing a specific example of the first setting screen 40 according to a fourth embodiment.

As shown in FIG. 17, in the first setting screen 40 of the second setting method according to the fourth embodiment, in a similar manner to the first setting screen 40 shown in the right side of FIG. 5, the authentication method selection field 43, the guest authority selection field 47, the guest password input field 48, and the show button 90 are displayed in the password information setting section 42. Further, a host password input field 66 is displayed in the password information setting section 42. The host password input field 66 is displayed at the lower side of the authentication method selection field 43. In the first setting screen 40 of the second setting method, a password for the highest authority (i.e., host password) is set in the host password input field 66 in addition to the guest password. The show button 90 for switching the display mode of the host password input field 66 is displayed at the right side of the host password input field 66.

In the fourth embodiment, the CPU 111 of the conference server 11 executes a third screen displaying process (see FIG. 18) as part of S27 of the conference setting process (see FIG. 3). The third screen displaying process is a process for performing display control of the first setting screen 40 of the second setting method shown in FIG. 17. When the first setting screen 40 of the second setting method is displayed on the conference creating terminal by S27, the CPU 111 executes the third screen displaying process as part of S27. In the third screen displaying process, in response to a screen operation performed on the conference creating terminal, the CPU 111 creates the updated first setting screen 40 or the update information and transmits the data to the conference creating terminal, thereby controlling the CPU 121 of the conference creating terminal to update the first setting screen 40 that is being displayed.

Figure 18:
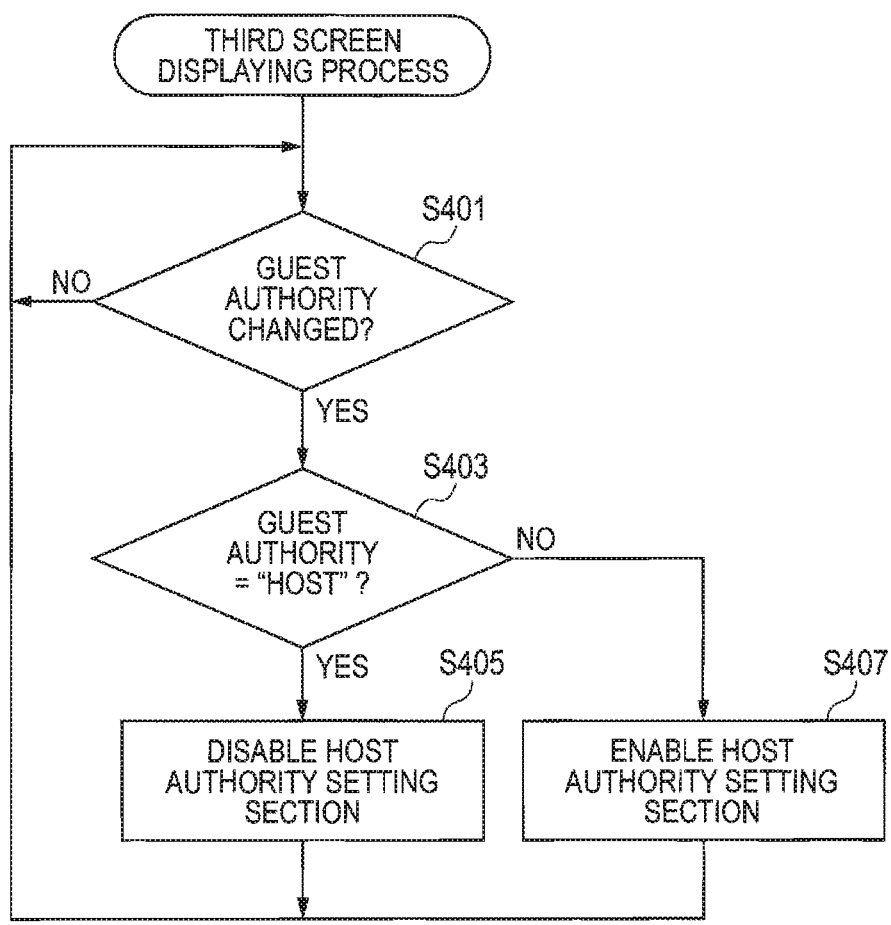
FIG. 18 shows a flowchart of a third screen displaying process.

As shown in FIG. 18, in the third screen displaying process, in a similar manner to S303 (see FIG. 14), first, the CPU 111 determines whether the guest authority selected in the guest authority selection field 47 has been changed (S401). When the guest authority has been changed (S401: YES), the CPU 111 determines whether the guest authority after change is "host" (S403). When the guest authority after change is "host" (S403: YES), the CPU 111 disables a host authority setting section (S405). The host authority setting section includes the host password input field 66 and the show button 90 located at the right side thereof. When the host authority setting section is disabled, the CPU 111 restricts an operation to the host authority setting section by the user 13. As shown in the right side of FIG. 17, the CPU 111 creates the first setting screen 40 such that the first setting screen 40 includes the host authority setting section of special display in which an operation of the user 13 is not received.

When the guest authority after change is not "host" (S403: NO), the CPU 111 enables the host authority setting section (S407). When the host authority setting section is enabled, the CPU 111 permits an operation to the host authority setting section by the user 13. As shown in the left side of FIG. 17, the CPU 111 creates the first setting screen 40 such that the first setting screen 40 includes the host authority setting section of regular display in which an operation of the user 13 is received. After executing S405 or S407 or when the guest authority is not changed (S401: NO), the CPU 111 returns the process to S401.

By the above-described process, in the first setting screen 40 of the first setting method shown in FIG. 17, the user 13 of the conference creating terminal can set a password of the highest authority "host", in addition to the guest password. When "host" is selected as the guest authority, the host authority setting section is disabled, which prevents the password of "host" from being set redundantly at a plurality of places.

Note that, when the create button 99 has been pressed in the first setting screen 40 shown in the left side of FIG. 17, the CPU 111 stores new conference information in the conference table 30 (see FIG. 2). The CPU 111 sets "default role" selected in the authentication method selection field 43 to the authentication method 30C, sets the authority selected in the guest authority selection field 47 to the guest authority 30H, and sets the password inputted in the guest password input field 48 to the guest password 30G. Further, the CPU 111 sets the password set in the host password input field 66 to the host password 30D.

In the fourth embodiment, the CPU 111 may execute a process similar to S301 (see FIG. 14) immediately after starting the third screen displaying process (see FIG. 18). In this case, when a host password is set in the first setting screen 40 of the first setting method before displaying the first setting screen 40 of the second setting method, the CPU 111 may set and display the host password in the host password input field 66.

<Examples of Effects of the Above-Described Embodiments>

In the above-described first to fourth embodiments, the authentication method selection field 43 that is selectable between displaying the first setting screen 40 of the first setting method and displaying the first setting screen 40 of the second setting method is displayed on the conference creating terminal that performs a setting operation of a teleconference, of the plurality of communication terminals 12 (S21 in FIG. 4). The first setting screen 40 of the first setting method includes the plurality of input fields 44 to 46 in which passwords are set for respective ones of at least three authorities having different number of executable functions in the teleconference. The first setting screen 40 of the second setting method includes the guest authority selection field 47 for setting one of at least three authorities as the guest authority, and the guest password input field 48 for setting a password for the guest authority set in the guest authority selection field 47. It is determined whether setting is performed such that the first setting screen 40 of the first setting method is displayed in the authentication method selection field 43 (S23, S25 in FIG. 4). When it is determined that setting is performed such that the first setting screen 40 of the first setting method is displayed, the first setting screen 40 of the first setting method is displayed on the conference creating terminal (S27 in FIG. 4). When it is determined that setting is not performed such that the first setting screen 40 of the first setting method is displayed, the first setting screen 40 of the second setting method is displayed on the conference creating terminal (S29 in FIG. 4).

With these processes, one of the first setting screen 40 of the first setting method and the first setting screen 40 of the second setting method can be displayed on the conference creating terminal in which a setting operation of a teleconference is performed. For example, when the user 13 of the conference creating terminal wishes to set a password for each of at least three authorities, the user 13 can set passwords on the first setting screen 40 of the first setting method. For example, when the user 13 of the conference creating terminal wishes to set a password for a selected one of at least three authorities, the user 13 can set passwords on the first setting screen 40 of the second setting method. In this way, when setting a password for giving authority in a conference, the user 13 can easily set a password by an optimal setting method.

Further, in the above-described first to fourth embodiments, one of the first setting screen 40 and the second setting screen 50 is displayed on the conference creating terminal (S7 in FIG. 3). The first setting screen 40 is a setting screen in which the first setting method and the second setting method can be switched. The second setting screen 50 is a setting screen in which the third setting method can be executed. The third setting method has the participation authority selection field 53 for setting one of at least three authorities, the additional password input field 54 for setting a password to the authority set in the participation authority selection field 53, and the additional display button 55 for additionally displaying the participation authority selection field 53 and the additional password input field 54. In the first setting screen 40 switched to the first setting method, passwords set in the plurality of input fields 44 to 46 are stored in the conference table 30 in association with respective authorities (S11 in FIG. 3). The guest password set in the guest password input field 48 in the first setting screen 40 switched to the second setting method is stored in the conference table 30 in association with the guest authority set in the guest authority selection field 47 (S11 in FIG. 3). In the second setting screen 50, the password set in the additional password input field 54 is stored in the conference table 30 in association with the authority set in the participation authority selection field 53 (S11 in FIG. 3).

With this process, one of the first setting screen 40 and the second setting screen 50 can be displayed on the conference creating terminal in which the setting operation of the teleconference is performed. For example, when the user 13 of the conference creating terminal wishes to additionally set a password to one of at least three authorities, the user 13 can set a password by the third setting method executed in the second setting screen 50, instead of the first setting method and the second setting method. In this way, when setting a password for giving authority in a conference, the user 13 can easily set a password by an optimal method out of the first to third setting methods.

In the third embodiment, when displaying the first setting screen 40 switched to the second setting method, the host password input field 64 and the presenter password input field 65 are displayed (S7 in FIG. 3). In the host password input field 64 and the presenter password input field 65, passwords needed for changing the authority given to the user 13 participating in the teleconference during the teleconference are set. The passwords set in the host password input field 64 and the presenter password input field 65 are stored in the conference table 30 in association with the authority after change (S11 in FIG. 3). Accordingly, the user 13 can easily set the authority changing password in the first setting screen 40, together with the guest password.

In the third embodiment, the guest authority set in the guest authority selection field 47 is extracted (S303 in FIG. 14). In the host password input field 64 and the presenter password input field 65, setting of a password to the input field corresponding to authority having a smaller number of executable functions than the extracted guest authority is restricted (S305 to S319 in FIG. 14). Accordingly, it is suppressed that the user 13 redundantly sets a password of the same authority in the first setting screen 40.

In the fourth embodiment, when the first setting screen 40 is displayed on the conference creating terminal, in the second setting method, the first setting screen 40 displays the host password input field 66 for setting a password for "host" that is the authority having the largest number of executable functions of at least three authorities, in addition to the guest password input field 48 (S7 in FIG. 3). Accordingly, the user 13 can easily set the host password in the first setting screen 40 in addition to the guest password.

In the fourth embodiment, it is determined whether the authority set in the guest authority selection field 47 by the second setting method is "host" (S403 in FIG. 18). When it is determined that the authority set in the guest authority selection field 47 is "host", setting of a password to the host password input field 66 is restricted (S405 in FIG. 18). Accordingly, it is suppressed that the user 13 redundantly sets a password for "host" in the first setting screen 40.

In the above-described first to fourth embodiments, the storage controlling process (the setting changing process in FIG. 10) is executed for storing, in the conference table 30, passwords for respective authorities set in one of the first setting screen 40 and the second setting screen 50. In the storage controlling process, when passwords for respective authorities are set in one of the first setting screen 40 and the second setting screen 50 during the teleconference, the set passwords for respective authorities are stored in the conference table 30 after the teleconference ends. Accordingly, the passwords for respective authorities set by the user 13 can be reflected in the conference table 30 after the teleconference ends.

While the disclosure has been described in detail with reference to the above aspects thereof, it would be apparent to those skilled in the art that various changes and modifications may be made therein without departing from the scope of the claims. For example, the CPU 111 may be a general-purpose processor. A part of the processes executed by the CPU 111 may be executed by another hardware processor (for example, electrical component such as an ASIC). The processes executed by the CPU 111 may be processed distributedly by a plurality of electrical devices (that is, a plurality of CPUs). For example, the conference creating process (FIG. 3) may be processed distributedly by the conference server 11 and the communication terminal 12.

The conference application for conducting a teleconference may be preliminarily installed on the plurality of communication terminals 12 through a storage medium or the network 14. In this case, by executing the conference application, the CPU 121 of each communication terminal 12 may transmit, to the conference server 11, the conference participation request, the authority changing request, the setting change request, and so on, in response to an operation of the user 13. The CPU 121 of each communication terminal 12 may create and display a screen in the conference application based on information for screen creation transmitted from the conference server 11 during the teleconference. In this case, without using a Web browser, the user 13 can use the conference application to perform operations of setting of a conference room, entrance to the conference room, executing the teleconference, changing of authority during the conference, changing of a conference room that is already set, and so on.

The first screen displaying process shown in FIG. 12, the second screen displaying process shown in FIG. 14, and the third screen displaying process shown in FIG. 18 are executed by the CPU 111 of the conference server 11. However, the CPU 121 of the conference creating terminal may execute the first to third screen displaying processes. For example, the CPU 121 may receive source information including a markup language such as HTML that is display data, scripts such as JAVA™ and so on, by the browser stored in the storage 124, and execute the third screen displaying process without communicating with the conference server 11.

When the conference application is capable of independently creating the first setting screen 40 and the second setting screen 50, the CPU 121 of the communication terminal 12 executes the conference application to create and display or update the first setting screen 40 or the second setting screen 50 in response to an operation of the user 13. For example, in the conference setting process (see FIG. 4), the CPU 121 may independently execute the processes of S21 and thereafter based on the conference application. In this case, when the create button 99 has been pressed in the communication terminal 12, the CPU 121 of the communication terminal 12 may transmit, to the conference server 11, information set in the first setting screen 40 or the second setting screen 50. That is, transmission of the conference ID, the authority, and the password by the CPU 121 corresponds to a storage controlling process of storing the information in the conference table 30 stored in the storage 114 of the conference server 11. Further, the communication terminal 12 executes the conference application to create and display or update the first setting screen 40 or the second setting screen 50, and receives a setting operation of a teleconference in the first setting screen 40 or the second setting screen 50. Thus, the communication terminal 12 serves as a setting apparatus. Note that the conference creating terminal need not necessarily be the communication terminal 12 that executes a teleconference.

The setting method of various pieces of information in the first setting screen 40 and the second setting screen 50 is not limited to the setting method illustrated in the above-described embodiments. For example, the authentication method selection field 43, the guest authority selection field 47, and the participation authority selection field 53 may be so configured that the user 13 can select an item by direct input, radio buttons, or the like, instead of the pull-down menu. The input fields 44 to 46 for respective authorities, the guest password input field 48, the additional password input field 54, the host password input field 64, the presenter password input field 65, and the host password input field 66 may be so configured that the user 13 can select one of preliminarily-prepared plurality of passwords by a pull-down menu, radio buttons, or the like, instead of direct input of passwords.

In the second embodiment, the CPU 111 need not necessarily disable the guest setting section (S211 in FIG. 12). In this case, the guest setting section is always enabled. Similarly, in the third embodiment, the CPU 111 need not necessarily disable the host authority changing section (S307 in FIG. 14) and the presenter authority changing section (S309, S315 in FIG. 14). In this case, the host authority changing section and the presenter authority changing section are always enabled. In the fourth embodiment, the CPU 111 need not necessarily disable the host authority setting section (S405 in FIG. 14). In this case, the host authority setting section is always enabled. When the CPU 111 disables each setting section, the CPU 111 may create the first setting screen 40 in which each setting section is hidden.

What is claimed is:

1. A non-transitory computer-readable storage medium storing a conference setting program for setting a teleconference conducted among a plurality of terminal apparatuses through a network, the conference setting program being executable on a computer of a setting apparatus configured to receive a setting operation of the teleconference, the conference setting program causing, when executed, the setting apparatus to perform operations comprising:
a display controlling operation of controlling displaying of an authentication method setting field configured to receive an operation to select either one of;
displaying a setting screen of a first setting method having a plurality of password setting fields in which a password is set to each of at least three authorities having different numbers of executable functions in the teleconference, the at least three authorities including a first level authority, a second level authority, and a third level authority, the first level authority being a higher level authority than the second level authority and the third level authority, the second level authority being a higher level authority than the third level authority; and
displaying a setting screen of a second setting method having a common authority setting field in which one of the at least three authorities is set as a common authority and having a common authority password setting field in which a password is set to the common authority set in the common authority setting field;
a determining operation of determining whether it is set that the setting screen of the first setting method is displayed in the authentication method setting field displayed by the display controlling operation;
a first display controlling operation of displaying the setting screen of the first setting method, in response to determining by the determining operation that it is set that the setting screen of the first setting method is displayed; and a second display controlling operation of displaying the setting screen of the second setting method, in response to determining by the determining operation that it is not set that the setting screen of the first setting method is displayed.

2. A non-transitory computer-readable storage medium storing a conference setting program for setting a teleconference conducted among a plurality of terminal apparatuses through a network, the conference setting program being executable on a computer of a setting apparatus configured to receive a setting operation of the teleconference, the conference setting program causing, when executed, the setting apparatus to perform operations comprising:

a display controlling operation of displaying one of a first setting screen and a second setting screen on a display of a particular terminal configured to perform a setting operation of the teleconference, the first setting screen being a setting screen that is switchable between:

a first setting method having a plurality of password setting fields in which a password is set to each of at least three authorities having different numbers of executable functions in the teleconference, the at least three authorities including a first level authority, a second level authority, and a third level authority, the first level authority being a higher level authority than the second level authority and the third level authority, the second level authority being a higher level authority than the third level authority; and a second setting method having a common authority setting field in which one of the at least three authorities is set as a common authority and having a common authority password setting field in which a password is set to the common authority set in the common authority setting field, the second setting screen being a setting screen for executing a third setting method having an authority setting field in which one of the at least three authorities is set, an additional password setting field in which a password is set to the authority set in the authority setting field, and an additional display button configured to receive an operation to additionally display the authority setting field and the additional password setting field; and a storage controlling operation of:

storing, in a storage, passwords set in the plurality of password setting fields in the first setting screen of the first setting method, in association with respective ones of the at least three authorities, the passwords being in one-to-one correspondence with the respective ones of the at least three authorities;

storing, in the storage, a common authority password set in the common authority password setting field in the first setting screen of the second setting method, in association with the common authority set in the common authority setting field; and storing, in the storage, the password set in the additional password setting field in the second setting screen, in association with the authority set in the authority setting field.

3. The storage medium according to claim 2, wherein the display controlling operation comprises, when displaying the first setting screen of the second setting method, displaying, on the first setting screen, an authority change password setting field for setting a password to change the authority given to a conference participant of the teleconference to a specific authority during the teleconference, the specific authority being one of the at least three authorities and different from the common authority; and wherein the storage controlling operation comprises storing, in the storage, a password set in the authority change password setting field in association with the specific authority.

4. The storage medium according to claim 3, wherein the display controlling operation comprises:

an extracting operation of extracting the common authority set in the common authority setting field; and a first restricting operation of restricting setting of a password in the authority change password setting field corresponding to the specific authority having a smaller number of executable functions than the common authority extracted in the extracting operation.

5. The storage medium according to claim 3, wherein the display controlling operation comprises:

an extracting operation of extracting the common authority set in the common authority setting field; and a first restricting operation of restricting setting of a password in the authority change password setting field corresponding to the common authority and a password in the authority change password setting field corresponding to the specific authority having a smaller number of executable functions than the common authority.

6. The storage medium according to claim 2, wherein the display controlling operation comprises displaying, on the first setting screen, a highest authority password setting field for setting a password for highest authority that is authority having a largest number of executable functions of the at least three authorities in the second setting method, in addition to the common authority password setting field.

7. The storage medium according to claim 6, wherein the display controlling operation comprises:

a determining operation of determining whether the authority set in the common authority setting field in the second setting method is the highest authority; and a second restricting operation of, in response to determining in the determining operation that the authority set in the common authority setting field is the highest authority, restricting setting of a password in the highest authority password setting field.

8. The storage medium according to claim 2, wherein the storage controlling operation comprises storing, in the storage, the password and one of the common authority and the authority in association with conference identification information identifying the teleconference; and wherein the conference setting program further causes, when executed, the setting apparatus to perform operations comprising:

a change request receiving operation of receiving a change request of either a password corresponding to the authority or a common authority password corresponding to the common authority, in one of the first setting screen and the second setting screen;

an end determining operation of determining whether a teleconference identified by the conference identification information is ended; and an update controlling operation of, in response to determining that the teleconference identified by the conference identification information is ended, storing, in the storage, either an updated password corresponding to the authority or an updated common authority password corresponding to the common authority included in the change request without storing, in the storage, either the updated password corresponding to the authority or the updated common authority password corresponding to the common authority included in the change request in response to determining that the teleconference identified by the conference identification information is not ended.

9. The storage medium according to claim 2, wherein the setting apparatus is configured to connect to the particular terminal through Internet; and
   wherein the display controlling operation comprises transmitting one of the first setting screen and the second setting screen to the particular terminal.

10. The storage medium according to claim 2, wherein the setting apparatus is configured to connect to the particular terminal through Internet; and
    wherein the display controlling operation comprises, in response to receiving a request from a Web browser provided in the particular terminal, transmitting display data, configured to generate one of the first setting screen and the second setting screen, to the particular terminal.

11. A conference setting method of setting a teleconference conducted among a plurality of terminal apparatuses through a network, the method comprising:
    a display controlling operation of displaying a first setting screen on a particular terminal configured to perform a setting operation of the teleconference, the first setting screen being a setting screen that is switchable between:
      a first setting method having a plurality of password setting fields in which a password is set to each of at least three authorities having different numbers of executable functions in the teleconference, the at least three authorities including a first level authority, a second level authority, and a third level authority, the first level authority being a higher level authority than the second level authority and the third level authority, the second level authority being a higher level authority than the third level authority; and
      a second setting method having a common authority setting field in which one of the at least three authorities is set as a common authority and having a common authority password setting field in which a password is set to the common authority set in the common authority setting field; and
    a storage controlling operation of:
      storing, in a storage, passwords set in the plurality of password setting fields in the first setting screen of the first setting method, in association with respective ones of the at least three authorities, the passwords being in one-to-one correspondence with the respective ones of the at least three authorities; and
      storing, in the storage, a common authority password set in the common authority password setting field in the first setting screen of the second setting method, in association with the common authority set in the common authority setting field.

* * * * *